United States Patent
Harikumar et al.

(10) Patent No.: US 9,014,250 B2
(45) Date of Patent: Apr. 21, 2015

(54) FILTER FOR IMPULSE RESPONSE SHORTENING WITH ADDITIONAL SPECTRAL CONSTRAINTS FOR MULTICARRIER TRANSMISSION

(71) Applicant: Tellabs Operations, Inc., Naperville, IL (US)

(72) Inventors: Gopal Harikumar, Norwood, MA (US); Daniel J. Marchok, Princeton, TX (US); Kenneth J. Rudofski, La Grange, IL (US)

(73) Assignee: Tellabs Operations, Inc., Naperville, IL (US)

( * ) Notice: Subject to any disclaimer, the term of this patent is extended or adjusted under 35 U.S.C. 154(b) by 102 days.

(21) Appl. No.: 13/730,025

(22) Filed: Dec. 28, 2012

(65) Prior Publication Data

US 2013/0208778 A1     Aug. 15, 2013

Related U.S. Application Data

(60) Continuation of application No. 13/673,927, filed on Nov. 9, 2012, now abandoned, which is a continuation-in-part of application No. 13/042,067, filed on Mar. 7, 2011, now Pat. No. 8,315,299, which (Continued)

(51) Int. Cl.
*H03H 7/30*     (2006.01)
*H04L 25/03*     (2006.01)

(52) U.S. Cl.
CPC ................ *H04L 25/03019* (2013.01)

(58) Field of Classification Search
USPC .................. 375/232, 371, 229; 370/286, 352
See application file for complete search history.

(56) References Cited

U.S. PATENT DOCUMENTS 3,795,772 A    3/1974    Hill et al.
3,978,482 A    8/1976    Williams (Continued)

FOREIGN PATENT DOCUMENTS

EP     0768778 A1    4/1997
EP     1 017 206 A2    7/2000

(Continued)

OTHER PUBLICATIONS

International Search Report—Aug. 13, 1999.

(Continued)

*Primary Examiner* — Eva Puente
(74) *Attorney, Agent, or Firm* — Hamilton Brook Smith & Reynolds P.C.

(57) ABSTRACT

A channel in a multiple carrier communication system is equalized by computing a desired spectral response, shortening the impulse response of the channel so that a significant part of an energy of the impulse response is confined to a region that is shorter than a target length and filtering the signal based on the desired spectral response. A multiple carrier communication system may include a primary impulse shortening filter that receives an output signal of an analog to digital converter and accepts coefficients. A secondary impulse shortening filter may receive the output signal of the analog to digital converter, output an output signal, and pass coefficients to the primary impulse shortening filter. A reference signal generator may output a reference signal. A comparator may compare the output signal and the reference signal and output a resulting error signal. An adaptive processor may compute coefficients for the secondary impulse shortening filter based on the error signal.

21 Claims, 17 Drawing Sheets

Related U.S. Application Data is a division of application No. 12/209,023, filed on Sep. 11, 2008, now Pat. No. 7,916,801, which is a continuation of application No. 10/898,499, filed on Jul. 23, 2004, now Pat. No. 7,440,498, which is a continuation of application No. 10/320,920, filed on Dec. 17, 2002, now Pat. No. 6,785,328, which is a division of application No. 09/233,914, filed on Jan. 21, 1999, now Pat. No. 6,526,105, application No. 13/730,025, which is a continuation of application No. 13/673,927, filed on Nov. 9, 2012, now abandoned, which is a continuation-in-part of application No. 13/374,524, filed on Dec. 30, 2011, now abandoned, which is a continuation of application No. 12/238,140, filed on Sep. 25, 2008, now Pat. No. 8,102,928, which is a continuation of application No. 11/759,789, filed on Jun. 7, 2007, now Pat. No. 7,430,242, which is a continuation of application No. 10/608,329, filed on Jun. 27, 2003, now Pat. No. 7,254,178, which is a continuation of application No. 09/054,468, filed on Apr. 3, 1998, now Pat. No. 6,631,175, application No. 13/730,025, which is a continuation-in-part of application No. 13/374,524, filed on Dec. 30, 2011, now abandoned, which is a continuation of application No. 12/238,140, filed on Sep. 25, 2008, now Pat. No. 8,102,928, which is a continuation of application No. 11/759,789, filed on Jun. 7, 2007, now Pat. No. 7,430,242, which is a continuation of application No. 10/608,329, filed on Jun. 27, 2003, now Pat. No. 7,254,178, which is a continuation of application No. 09/054,468, filed on Apr. 3, 1998, now Pat. No. 6,631,175.

(60) Provisional application No. 60/087,336, filed on May 29, 1998.

(56) References Cited

U.S. PATENT DOCUMENTS

| | | |
|---|---|---|
| 4,184,347 A | 1/1980 | Tobita et al. |
| 4,300,229 A | 11/1981 | Hirosaki |
| 4,351,983 A | 9/1982 | Crouse et al. |
| 4,361,813 A | 11/1982 | Watatani |
| 4,399,329 A | 8/1983 | Wharton |
| 4,425,665 A | 1/1984 | Stauffer |
| 4,535,472 A | 8/1985 | Tomcik |
| 4,618,996 A | 10/1986 | Rafal et al. |
| 4,630,305 A | 12/1986 | Borth et al. |
| 4,731,816 A | 3/1988 | Hughes-Hartogs |
| 4,817,141 A | 3/1989 | Taguchi |
| 4,931,803 A | 6/1990 | Shimko |
| 4,951,279 A | 8/1990 | Hotta |
| 4,956,835 A | 9/1990 | Grover |
| 4,980,897 A | 12/1990 | Decker et al. |
| 5,001,724 A | 3/1991 | Birgenheier et al. |
| 5,014,306 A | 5/1991 | Rodgers et al. |
| 5,077,727 A | 12/1991 | Suzuki |
| 5,103,459 A | 4/1992 | Gilhousen et al. |
| 5,192,957 A | 3/1993 | Kennedy |
| 5,206,886 A | 4/1993 | Bingham |
| 5,216,670 A | 6/1993 | Ofek et al. |
| 5,228,025 A | 7/1993 | LeFloch et al. |
| 5,233,546 A | 8/1993 | Witte |
| 5,235,621 A | 8/1993 | Amir-Alikhani |
| 5,253,270 A | 10/1993 | Petit |
| 5,260,968 A | 11/1993 | Gardner et al. |
| 5,285,474 A | 2/1994 | Chow et al. |
| 5,301,205 A | 4/1994 | Tsutsui et al. |
| 5,323,255 A | 6/1994 | Sierens et al. |
| 5,345,599 A | 9/1994 | Paulraj et al. |
| 5,406,627 A | 4/1995 | Thompson et al. |
| 5,414,433 A | 5/1995 | Chang et al. |
| 5,416,767 A | 5/1995 | Koppelaar et al. |
| 5,416,801 A | 5/1995 | Chouly et al. |
| 5,444,697 A | 8/1995 | Leung et al. |
| 5,461,640 A | 10/1995 | Gatherer |
| 5,471,464 A | 11/1995 | Ikeda |
| 5,479,447 A | 12/1995 | Chow et al. |
| 5,483,529 A | 1/1996 | Baggen et al. |
| 5,499,271 A | 3/1996 | Plenge et al. |
| 5,502,749 A | 3/1996 | Ozaki |
| 5,521,908 A | 5/1996 | Younce et al. |
| 5,524,001 A | 6/1996 | Beaudry et al. |
| 5,530,703 A | 6/1996 | Liu et al. |
| 5,539,777 A | 7/1996 | Grube et al. |
| 5,548,819 A | 8/1996 | Robb |
| 5,553,064 A | 9/1996 | Paff et al. |
| 5,557,612 A | 9/1996 | Bingham |
| 5,559,789 A | 9/1996 | Nakano et al. |
| 5,566,209 A | 10/1996 | Forssen et al. |
| 5,568,483 A | 10/1996 | Padovani et al. |
| 5,583,967 A | 12/1996 | Akagiri |
| 5,594,757 A | 1/1997 | Rohani |
| 5,596,582 A | 1/1997 | Sato et al. |
| 5,596,605 A | 1/1997 | Kiyanagi et al. |
| 5,602,835 A | 2/1997 | Seki et al. |
| 5,603,081 A | 2/1997 | Raith et al. |
| 5,608,725 A | 3/1997 | Grube et al. |
| 5,608,764 A | 3/1997 | Sugita et al. |
| 5,610,908 A | 3/1997 | Shelswell et al. |
| 5,621,730 A | 4/1997 | Kelley |
| 5,625,651 A | 4/1997 | Cioffi |
| 5,627,863 A | 5/1997 | Aslanis et al. |
| 5,636,246 A | 6/1997 | Tzannes et al. |
| 5,636,250 A | 6/1997 | Scarpa |
| 5,675,572 A | 10/1997 | Hidejima et al. |
| 5,675,608 A | 10/1997 | Kim et al. |
| 5,682,376 A | 10/1997 | Hayashino et al. |
| 5,684,920 A | 11/1997 | Iwakami et al. |
| 5,687,165 A | 11/1997 | Daffara et al. |
| 5,694,389 A | 12/1997 | Seki et al. |
| 5,703,873 A | 12/1997 | Ojanpera et al. |
| 5,708,662 A | 1/1998 | Takashima |
| 5,726,978 A | 3/1998 | Frodigh et al. |
| 5,732,068 A | 3/1998 | Takahashi et al. |
| 5,771,024 A | 6/1998 | Reece et al. |
| 5,774,450 A | 6/1998 | Haranda et al. |
| 5,778,001 A | 7/1998 | Nakayama et al. |
| 5,784,363 A | 7/1998 | Engstrom et al. |
| 5,786,844 A | 7/1998 | Rodgers et al. |
| 5,790,514 A | 8/1998 | Marchok et al. |
| 5,790,516 A | 8/1998 | Gudmundson et al. |
| 5,790,554 A | 8/1998 | Pitcher et al. |
| 5,790,615 A | 8/1998 | Beale et al. |
| 5,790,784 A | 8/1998 | Beale et al. |
| 5,796,820 A | 8/1998 | Sasada |
| 5,809,030 A | 9/1998 | Mestdagh et al. |
| 5,812,523 A | 9/1998 | Isaksson et al. |
| 5,812,599 A | 9/1998 | Van Kerckhove |
| 5,815,488 A | 9/1998 | Williams et al. |
| 5,828,710 A | 10/1998 | Beale |
| 5,841,813 A | 11/1998 | Van Nee |
| 5,844,951 A | 12/1998 | Proakis et al. |
| 5,850,444 A | 12/1998 | Rune |
| 5,862,007 A | 1/1999 | Pham et al. |
| 5,864,546 A | 1/1999 | Campanella |
| 5,867,764 A | 2/1999 | Williams |
| 5,870,432 A | 2/1999 | Kerckhove |
| 5,881,047 A | 3/1999 | Bremer et al. |
| 5,890,187 A | 3/1999 | Asghar |
| 5,909,465 A | 6/1999 | Bottomley et al. |
| 5,912,919 A | 6/1999 | Lomp et al. |
| 5,912,920 A | 6/1999 | Marchok et al. |
| 5,919,137 A | 7/1999 | Finger et al. |
| 5,933,421 A | 8/1999 | Alamouti et al. |
| 5,936,961 A | 8/1999 | Chiodini et al. |
| 5,949,796 A | 9/1999 | Kumar |
| 5,983,078 A | 11/1999 | Bossard |
| 5,984,514 A | 11/1999 | Greene et al. |
| 5,987,063 A | 11/1999 | Rinne |
| 5,995,483 A | 11/1999 | Marchok et al. |

(56) References Cited

U.S. PATENT DOCUMENTS

| | | | |
|---|---|---|---|
| 5,995,568 A | 11/1999 | Molnar et al. | |
| 6,002,722 A | 12/1999 | Wu | |
| 6,009,130 A | 12/1999 | Lurey et al. | |
| 6,018,317 A | 1/2000 | Dogan et al. | |
| 6,023,674 A | 2/2000 | Mekuria | |
| 6,028,891 A | 2/2000 | Ribner et al. | |
| 6,035,000 A | 3/2000 | Bingham | |
| 6,044,107 A | 3/2000 | Gatherer et al. | |
| 6,047,020 A | 4/2000 | Hottinen | |
| 6,047,025 A | 4/2000 | Johnson et al. | |
| 6,055,362 A | 4/2000 | Kesner et al. | |
| 6,055,575 A | 4/2000 | Paulsen et al. | |
| 6,061,796 A | 5/2000 | Chen et al. | |
| 6,069,917 A | 5/2000 | Werner et al. | |
| 6,072,782 A | 6/2000 | Wu | |
| 6,073,176 A | 6/2000 | Baindur et al. | |
| 6,073,179 A | 6/2000 | Liu et al. | |
| 6,075,777 A | 6/2000 | Agrawal et al. | |
| 6,075,816 A | 6/2000 | Werner et al. | |
| 6,079,020 A | 6/2000 | Liu | |
| 6,088,386 A | 7/2000 | Spruyt et al. | |
| 6,091,932 A | 7/2000 | Langlais | |
| 6,097,763 A | 8/2000 | Djokovic et al. | |
| 6,101,230 A | 8/2000 | Chun et al. | |
| 6,104,930 A | 8/2000 | Ward et al. | |
| 6,108,349 A | 8/2000 | Marchok et al. | |
| 6,108,610 A | 8/2000 | Winn | |
| 6,118,758 A | 9/2000 | Marchok et al. | |
| 6,122,246 A | 9/2000 | Marchok et al. | |
| 6,122,260 A | 9/2000 | Liu et al. | |
| 6,125,150 A | 9/2000 | Wesel et al. | |
| 6,128,276 A | 10/2000 | Agee | |
| 6,134,591 A | 10/2000 | Nickles | |
| 6,141,317 A | 10/2000 | Marchok et al. | |
| 6,141,335 A | 10/2000 | Kuwahara et al. | |
| 6,144,340 A | 11/2000 | Kiiski et al. | |
| 6,144,711 A | 11/2000 | Raleigh et al. | |
| 6,148,023 A | 11/2000 | Pelin et al. | |
| 6,148,024 A | 11/2000 | Ho et al. | |
| 6,154,839 A | 11/2000 | Arrow et al. | |
| 6,185,251 B1 | 2/2001 | Fertner | |
| 6,185,257 B1 | 2/2001 | Moulsley | |
| 6,212,175 B1 | 4/2001 | Harsch | |
| 6,212,635 B1 | 4/2001 | Reardon | |
| 6,259,729 B1 | 7/2001 | Seki | |
| 6,266,367 B1 | 7/2001 | Strait | |
| 6,272,108 B1 | 8/2001 | Chapman | |
| 6,279,022 B1 | 8/2001 | Miao et al. | |
| 6,285,654 B1 | 9/2001 | Marchok et al. | |
| 6,308,213 B1 | 10/2001 | Valencia | |
| 6,320,902 B1 | 11/2001 | Nafie et al. | |
| 6,347,234 B1 | 2/2002 | Scherzer | |
| 6,347,237 B1 | 2/2002 | Eden et al. | |
| 6,353,629 B1 | 3/2002 | Pal | |
| 6,353,630 B1 | 3/2002 | Schreib | |
| 6,353,636 B1 | 3/2002 | Tate et al. | |
| 6,370,156 B2 | 4/2002 | Spruyt et al. | |
| 6,427,134 B1 | 7/2002 | Garner et al. | |
| 6,466,557 B1 | 10/2002 | Doi | |
| 6,473,394 B1 | 10/2002 | Marchok et al. | |
| 6,487,252 B1 | 11/2002 | Kleider et al. | |
| 6,487,598 B1 | 11/2002 | Valencia | |
| 6,526,105 B1 | 2/2003 | Harikumar et al. | |
| 6,529,868 B1 | 3/2003 | Chandran et al. | |
| 6,557,037 B1 | 4/2003 | Provino | |
| 6,631,175 B2 | 10/2003 | Harikumar et al. | |
| 6,654,429 B1 | 11/2003 | Li | |
| 6,690,680 B1 | 2/2004 | Marchok et al. | |
| 6,765,881 B1 | 7/2004 | Rajakarunanayake | |
| 6,771,590 B1 | 8/2004 | Marchok et al. | |
| 6,772,332 B1 | 8/2004 | Boebert et al. | |
| 6,795,424 B1 | 9/2004 | Kapoor et al. | |
| 6,804,192 B1 | 10/2004 | Marchok et al. | |
| 6,884,192 B2 | 4/2005 | Konno et al. | |
| 6,912,194 B1 | 6/2005 | Marchok et al. | |
| 6,948,076 B2 | 9/2005 | Saito | |
| 6,950,388 B2 | 9/2005 | Marchok et al. | |
| 6,999,772 B2 | 2/2006 | Song et al. | |
| 7,010,608 B2 | 3/2006 | Garg et al. | |
| 7,032,242 B1 | 4/2006 | Grabelsky et al. | |
| 7,058,572 B1 | 6/2006 | Nemer | |
| 7,096,182 B2 | 8/2006 | Chandran et al. | |
| 7,254,178 B2 | 8/2007 | Harikumar et al. | |
| 7,369,990 B2 | 5/2008 | Nemer | |
| 7,424,424 B2 | 9/2008 | Chandran et al. | |
| 7,430,242 B2 | 9/2008 | Harikumar et al. | |
| 7,440,498 B2 | 10/2008 | Harikumar et al. | |
| 7,471,734 B2 | 12/2008 | Thomas et al. | |
| 7,613,102 B2 | 11/2009 | Marchok et al. | |
| 7,616,553 B2 | 11/2009 | Marchok et al. | |
| 8,472,814 B2 * | 6/2013 | Zhang et al. | 398/208 |
| 2001/0020241 A1 | 9/2001 | Kawamoto et al. | |
| 2001/0040920 A1 | 11/2001 | Nafie et al. | |
| 2002/0007454 A1 | 1/2002 | Tarpenning et al. | |
| 2002/0075818 A1 * | 6/2002 | Matsuo | 370/286 |
| 2002/0078379 A1 | 6/2002 | Edwards et al. | |
| 2002/0098795 A1 | 7/2002 | Brede et al. | |
| 2002/0105928 A1 | 8/2002 | Kapoor et al. | |
| 2002/0147791 A1 | 10/2002 | Choi | |
| 2003/0040908 A1 | 2/2003 | Yang et al. | |
| 2003/0128752 A1 | 7/2003 | Harikumar et al. | |
| 2003/0193917 A1 | 10/2003 | Song et al. | |
| 2003/0196087 A1 | 10/2003 | Stringer et al. | |
| 2004/0091056 A1 | 5/2004 | Harikumar et al. | |
| 2004/0151239 A1 * | 8/2004 | Koyanagi et al. | 375/229 |
| 2004/0184484 A1 | 9/2004 | Marchok et al. | |
| 2004/0240669 A1 | 12/2004 | Kempf et al. | |
| 2004/0246890 A1 | 12/2004 | Marchok et al. | |
| 2006/0034166 A1 | 2/2006 | Marchok et al. | |
| 2006/0229869 A1 | 10/2006 | Nemer | |
| 2007/0033642 A1 | 2/2007 | Ganesan et al. | |
| 2007/0070960 A1 | 3/2007 | Barak et al. | |
| 2007/0110096 A1 | 5/2007 | Geile et al. | |
| 2008/0144487 A1 | 6/2008 | Marchok et al. | |
| 2008/0144731 A1 | 6/2008 | Marchok et al. | |
| 2008/0298483 A1 | 12/2008 | Marchok et al. | |
| 2009/0022216 A1 | 1/2009 | Harikumar et al. | |
| 2009/0024387 A1 | 1/2009 | Chandran et al. | |
| 2011/0182391 A1 * | 7/2011 | Feller | 375/371 |
| 2011/0293053 A1 | 12/2011 | Harikumar et al. | |
| 2012/0183034 A1 | 7/2012 | Harikumar et al. | |
| 2013/0034159 A1 * | 2/2013 | Siekmann et al. | 375/240.12 |
| 2014/0039824 A1 * | 2/2014 | Zheng et al. | 702/106 |

FOREIGN PATENT DOCUMENTS

| | | | |
|---|---|---|---|
| JP | 10-504168 A | 4/1998 | |
| JP | 11-203248 A | 7/1999 | |
| JP | 2001-134534 A | 5/2001 | |
| JP | 2001-237818 A | 8/2001 | |
| WO | WO 87/00366 A1 | 1/1987 | |
| WO | WO 93/26096 | 12/1993 | |
| WO | WO 95/15550 A1 | 6/1995 | |
| WO | WO 99/52250 A1 | 10/1999 | |
| WO | WO 00/41169 A1 | 7/2000 | |
| WO | WO 00/49755 A2 | 8/2000 | |
| WO | WO 01/73760 A1 | 10/2001 | |

OTHER PUBLICATIONS

Melsa, et al., "Impulse Response Shortening for Discrete Multitone Transceivers," *IEEE Transactions on Communications*, vol. 44, No. 12, pp. 1662-1672.(1996).

Al-Dhahir, N., "Joint Channel and Echo Impulse Response Shortening on Digital Subscriber Lines," vol. 3, No. 10, IEEE Signal Processing Letters, p£. 280-282 (1996).

Falconer, et al., "Adaptive Channel Memory Truncation for Maximum Likelihood Sequence Estimation," *The Bell System Technical Journal*, vol. 52, No. 9, pp. 1541-1562 (1973).

Harikumar, et al., "Spectrally Constrained Impulse-Shortening Filters for use in DMT Systems," pp. 1-9 (1998).

Melsa, et al., "Optimal Impulse Response Shortening," *Tellabs Research Center, Tellabs Operations Inc.*, pp, 431-438 (1995).

(56) References Cited

OTHER PUBLICATIONS

Worthen et al., "Simulation of VDSL Test Loops," *Tellabs Research, T1E1.* 288, pp. 1-16 (1997).
Chow et al., "A Cost-Effective Maximum Likelihood Receiver for Multicarrier Systems," *Information Systems Laboratory*, 333.7.1, CH3132-8/0000-0948, *IEEE*, pp. 948-952 (1992).
Harikumar et al., "Shortening the Channel Impulse Response of VDSL Loops for Multi-Carrier Applications," *Tellabs Research, T1E1.*, 289; pp. 1-7 (1997).
Harikumar et al., "Minimizing Noise Bleeding in DMT Systems with a TEQ," *Tellabs Research*, T1E1., 181; pp. 1-4 (1998).
Chow et al., "A Discrete Multitone Transceiver System for HDSL Applications," vol. 9, No. 6, *IEEE Journal on Selected Areas in Communications*, pp. 895-908 (1997).
Jacobsen, K., "VDSL Alliance—SDMT VDSL Draft Standard Proposal," 0611, *T1E1 A*-172, pp. 1-48 (1998).
Jacobsen, K., "DMT Group—VDSL PMD Draft Standard Proposal," 0511, *T1 EIA*-329R2, pp. 1-19 (1997).
Cioffi, "Very-high-speed Digital Subscriber Lines, System Requirements," *Draft Technical Report-Revision 9, American National Standards Institute T1 E*, 104-133, pp. 1-34 (1997).
Cimini, Jr., "Analysis and Simulation of a Digital Mobile Channel using Orthogonal Frequency Division Multiplexing," *IEEE Transactions on Communications*, vol. Comm.-33, No. 7, pp. 665-675 (1985).
Harikumar, et al., "Time-Domain Equalization in DMT Systems," *Tellabs*, (1998).
Melsa, et al., "Joint Impulse Response Shortening," *Global Telecommunication Conference*, Communications: The Key to Global Prosperity 18-22, pp. 209-213 (1996).
Bingham, "Multicarrier Modulation for Data Transmission: An Idea Whose Time has Come," pp. 5-8, (1990).
Whittle, "The Optus Vision: Telephony, Internet, and Video,"*Australian Communications*, 7 pages (1996).
"Cablespan 2300," Training Presentation, *Tellabs, Inc.*, pp. 1-17 (1996).
Moose, "A Technique for Orthogonal Frequency Division Multiplexing Frequency Offset Correction," *IEEE Transactions on Communications*, vol. 42, No. 10 (1994).
Jacobsen, et al., "Synchronized DMT for Multipoint-to-Point Communications on HFC Networks," *Information Systems Laboratory, IEEE Global Communications Conference in Singapore*, pp. 1-10 (1995).
Cimini, "Analysis and Simulation of a Digital Mobile Channel Using Orthogonal Frequency Division Multiplexing," *IEEE Transactions on Communication*, pp. 665-675 (1985).
Kennedy, et al., "Direction Finding and 'Smart Antennas' Using Software Radio Architectures," *IEEE Communications Magazine*, pp. 62-68 (May 1995).
Paulraj, "Antenna Array Signal Processing with Applications to Mobile Communications," Second Workshop on Smart Antennas in Wireless Mobile Communications, Stanford University, Stanford, CA 94305, pp. 1-120 (1995).
Russell, et al., "Terrestrial Digital Video Broadcasting for Mobile Reception using OFDM," *Wireless Personal Communications*, 2:45-66 (1995).
Swales, et al., "The Performance Enhancement of Multi-Beam Adaptive Base-Station Antennas for Cellular Land Mobile Radio Systems," *IEEE Transactions on Vehicular Technology*, 39(1): 56-77 (Feb. 1990).
"Guide to Choosing a Wireless Base Station Antenna System," pp. 7-11 (date unknown).
McCaulay, et al., "Speech Enhancement Using a soft-Decision Noise Suppression Filter," *IEEE Transactions on Acoustics, Speech and Signal Processing*, vol. 28, No. 2, pp. 137-145 (1980).
Berouti,.etal., "Enhancement of Speech Corrupted by Acoustic Noise," *IEEE Conference on Acoustics, Speech and Signal Processing*, pp. 208-211, (1979).
Vaseght, "Advanced Signal Processing and Digital Noise Reduction," Chapter 9, pp. 242-260, (ISBN Wiley 0471958751) (1996).
Lim, et al., "Enhancement and Bandwidth Compression by Noisy Speech,"*Proceedings of the IEEE*, vol. 67, No. 12, pp. 1586-1604, (1979).
Extended European Search Report, dated Nov. 19, 2010, for Application No. 10185268.9-1237, consisting of 12 pages.
International Search Report for Int'l Application No. PCT/US01/ 06889; Date Mailed: Jun. 7, 2001.
Schneier, "Applied Cryptography, Protocols,. Algorithms, and Source Code in C; ISBN: 0-471-11709-9, 0-471-12845-7," John Wiley and Sons, Inc., New York, (1996).
This reference was a duplicate—See Reference C2.
Very High-Speed Digital Subscriber Lines, Draft Technical Report-Revision 9, T1E1.4/97-131, ANSI (1997).
This reference was a duplicate—See Reference C33.

* cited by examiner

FILTER FOR IMPULSE RESPONSE SHORTENING WITH ADDITIONAL SPECTRAL CONSTRAINTS FOR MULTICARRIER TRANSMISSION

RELATED APPLICATION(S)

The present application is a continuation of U.S. application Ser. No. 13/673,927 filed Nov. 9, 2012, which is a continuation-in-part of U.S. application Ser. No. 13/042,067 filed Mar. 7, 2011, now U.S. Pat. No. 8,315,299, which is a divisional of U.S. application Ser. No. 12/209,023, filed Sep. 11, 2008, now U.S. Pat. No. 7,916,801, which is a continuation of U.S. application Ser. No. 10/898,499, filed Jul. 23, 2004, now U.S. Pat. No. 7,440,498, which is a continuation of U.S. application Ser. No. 10/320,920, filed Dec. 17, 2002, now U.S. Pat. No. 6,785,328, which is a divisional of U.S. application Ser. No. 09/233,914, filed Jan. 21, 1999, now U.S. Pat. No. 6,526,105, which claims the benefit of U.S. Application No. 60/087,336 filed May 29, 1998, all of which are entitled "Time-Domain Equalization for Discrete Multi-Tone Systems."

Further, the present application and the parent application, U.S. application Ser. No. 13/673,927 filed Nov. 9, 2012, are both a continuation-in-part of U.S. application Ser. No. 13/374,524 filed Dec. 30, 2011, which is a continuation of U.S. application Ser. No. 12/238,140, filed Sep. 25, 2008, now U.S. Pat. No. 8,102,928, which is a continuation of U.S. application Ser. No. 11/759,789, filed Jun. 7, 2007, now U.S. Pat. No. 7,430,242, which is a continuation of Ser. No. 10/608,329, filed Jun. 27, 2003, now U.S. Pat. No. 7,254,178, which is a continuation of U.S. application Ser. No. 09/054,468, filed Apr. 3, 1998, now U.S. Pat. No. 6,631,175, all of which are entitled "Spectrally Constrained Impulse Shortening Filter For A Discrete Multi-Tone Receiver."

One of the priority applications, U.S. application Ser. No. 12/209,023, filed Sep. 11, 2008, now U.S. Pat. No. 7,916,801, is also related to U.S. application Ser. No. 09/054,468, filed Apr. 3, 1998, now U.S. Pat. No. 6,631,175, all of which are entitled "Time-Domain Equalization for Discrete Multi-Tone Systems."

The entire teachings of the above applications are incorporated herein by reference.

BACKGROUND

The invention relates to time-domain equalization in a discrete multi-tone (DMT) receiver.

Conventional single carrier modulation techniques translate data bits for transmission through a communication channel by varying the amplitude and/or phase of a single sinusoidal carrier. By contrast, DMT, which is also referred to as Orthogonal Frequency Division Multiplexing (OFDM) or Multicarrier Modulation (MCM), employs a large number of sinusoidal subcarriers, e.g., 128 or 256 subcarriers. The available bandwidth of the communication channel is divided into subchannels and each subchannel communicates a part of the data. A DMT system may employ quadrature amplitude modulation (QAM) for each of the subcarriers.

OFDM-based systems transmit blocks of information bits. The time required to transmit one such block is called the symbol period. The time domain waveform that corresponds to one such block of bits is called a symbol.

Intersymbol interference (ISI) arises from the characteristics of practical communication channels and limits the rate at which information can be transmitted through them. Specifically, communication channels typically have an Effective Discrete-Time Impulse Response (EDIR) that is greater than one sample time in length, which causes ISI. ISI is a well-known phenomenon in single-carrier communication systems and there are many techniques for reducing it. The process of such ISI reduction is called equalization. ISI is discussed, for example, in Proakis, Digital Communications, McGraw Hill, 2nd Edition, 1989.

Equalization in OFDM-based systems is achieved by a two stage process. First, at the transmitter, a Cyclic Prefix (CP) is employed by affixing an end-portion of each symbol to the beginning of the symbol. A cyclic prefix that is greater than the EDIR of the channel prevents one symbol from interfering with another. Furthermore, it also facilitates a simple method of neutralizing the time domain spread of each symbol forced by the channel. This is achieved through a simple frequency domain process in the receiver which requires one multiplication operation for each subcarrier used. The use of a Cyclic Prefix to reduce ISI is discussed, for example, in: Cimini, "Analysis and Simulation of a Digital Mobile Channel using Orthogonal Frequency Division Multiplexing," IEEE Transactions on communications, pp 665-675, July 1985; Chow, "A Discrete Multi-Tone Transceiver System for HDSL applications," IEEE Journal on Selected Areas of Communications, 9(6):895-908, August 1991; and "DMT Group VDSL PMD Draft Standard Proposal," Technical Report, T1E1.4/96-329R2, ANSI 1997.

Another problem arising in conventional DMT systems is noise bleeding, which occurs when noise from one frequency band interferes with a signal whose subcarrier is in another frequency band. Noise bleeding is caused, in general, by a discrete Fourier transform (DFT) operation at the receiver. Noise bleeding is discussed in, for example, Worthen et. al., "Simulation of VDSL Test Loops," Technical Report T1E1.4/97-288, ANSI 1997.

In a perfectly synchronized DMT system, a signal in one frequency band does not interfere with a signal whose subcarrier is in another frequency band. However, noise from one band may interfere with other less noisy bands and render them unusable. Techniques for dealing with noise-bleeding include wavelet-based solutions. However, wavelet-based solutions are, in general, computationally intensive.

Other references dealing with time domain equalization include: Chow, J. S. and Cioffi, J. M., "A Cost-effective Maximum Likelihood Receiver for Multicarrier Systems", *Proceedings of the ICC,* 1992; Melsa, Peter J. W., Younce, Richard C., and Rohrs, Charles E., "Optimal Impulse Response Shortening", *Proceedings of the thirty-third Annual Allerton Conference on Communication, Control and Computing,* 1995, pp. 431-438; Harikumar, Gopal and Marchok, Daniel, "Shortening the Channel Impulse Response of VDSL Loops for Multicarrier Applications", Technical report T1E1.4/97-289, ANSI, 1997.

SUMMARY

The invention provides a spectrally constrained impulse shortening filter (SCISF) for use, for example, in DMT systems. The SCISF serves two primary functions.

First, the SCISF reduces intersymbol interference (ISI) by reducing the length of the effective discrete-time impulse response (EDIR) of the communication channel. Conventional impulse shortening filters may have deep nulls in their frequency response. By contrast, the SCISF has a filter characteristic that is essentially free from undesired nulls that may attenuate or completely eliminate certain subcarriers.

Second, the SCISF reduces noise bleeding between subchannels by attenuating noisy channels in a manner that does not reduce the signal to noise ratio (SNR) in these channels, but reduces the noise power that may appear in the sidelobes of adjacent subchannels. The SCISF accomplishes these functions by applying a frequency constraint to the signal based on a desired spectral response.

In one general aspect, the invention features equalizing a channel in a multiple carrier communication system. The system includes a spectrally constrained impulse shortening filter. Received noise power spectral density is measured. A desired spectral response is computed based on the measured noise power. A frequency response for the spectrally constrained impulse shortening filter is selected based on the desired spectral response. The communication signal is filtered with the spectrally constrained impulse shortening filter.

Embodiments may include one or more of the following features. The noise power spectral density may be measured at the output of the discrete Fourier transform. The spectrally constrained impulse shortening filter may be a time domain digital filter.

In another aspect, the invention features equalizing a channel in a multiple carrier communication system. The channel has an impulse response and is configured to receive a signal having a cyclic prefix. A desired spectral response is computed. The impulse response of the channel is shortened so that a significant part of the energy of the impulse response is confined to a region that is shorter than a target length, and the signal is filtered based on the desired spectral response.

The target length may be a length of the cyclic prefix. The desired spectral response may be computed from measured noise power density, which may be measured at the output of a discrete Fourier transform. For example, the desired spectral response may be the inverse of the measured noise power spectral density. The filtering step may be performed with a filter having a frequency response selected to match the desired spectral response. The shortening of the impulse response and/or the filtering may be performed by a time domain digital filter.

In another general aspect, the invention features selecting an impulse response for a spectrally constrained impulse shortening filter in a multiple carrier communication system. Received noise power spectral density is measured. A cost function is computed using the noise power. The cost function is dependent on the impulse response. The dimensionality of a space over which the cost function is defined is reduced and the cost function is minimized. The noise power spectral density may be measured at the output of a discrete Fourier transform. The cost function may be used to compute coefficients for the spectrally constrained impulse shortening filter.

In another general aspect, the invention features a spectrally constrained impulse shortening filter for a multiple carrier communication system. The system includes a channel that has an impulse response. A digital filter structure receives the signal and apply a frequency characteristic to the signal. The frequency characteristic is determined by filter coefficients. Filter coefficients are selected to shorten the impulse response of the channel so that a significant part of the energy of the impulse response is confined to a region that is shorter than a target length and to apply a frequency characteristic to the signal based on a desired spectral response. The selected filter coefficients are input to the taps of the filter.

In another general aspect, the invention features a receiver for receiving a multiple carrier signal from a communication channel having an impulse response. An analog-to-digital converter receives the signal from the communication channel. A spectrally constrained impulse shortening filter receives the signal from the analog-to-digital converter and shortens the impulse response of the channel so that a significant part of an energy of the impulse response is confined to a region that is shorter than a target length. The filter also applies a frequency characteristic to the signal based on a desired spectral response. A discrete Fourier transform receives the output of the spectrally constrained impulse shortening filter and a decoder receives outputs of the discrete Fourier transform.

In another aspect, the invention features a modem in which an encoder receives digital data and outputs a constellation of complex values. An inverse discrete Fourier transform receives the constellation from the encoder. A digital-to-analog converter is connected to the inverse discrete Fourier transform and outputs a signal to a communication channel. An analog-to-digital converter receives the signal from the communication channel. A spectrally constrained impulse shortening filter shortens an impulse response of the channel so that a significant part of an energy of the impulse response is confined to a region that is shorter than a target length. The signal is filtered based on a desired spectral response. A discrete Fourier transform connected to the filter and a decoder is connected to the discrete Fourier transform and outputs digital data.

In another aspect, the invention features software for causing a processor in a communication system to perform the following operations: measure received noise power spectral density; and compute a desired spectral response based on the measured noise power. The software may also include instructions for causing a processor to compute filter coefficients based on the desired spectral response.

In another aspect, the invention features software for causing a processor in a communication system to measure received noise power spectral density. A cost function is computed using the noise power. The cost function is dependent on an impulse response of a spectrally constrained impulse shortening filter. The dimensionality of a space over which the cost function is defined is reduced, and the cost function is minimized.

The techniques described here are not limited to any particular hardware or software configuration. They may find applicability in any computing or processing environment that may be used for a communication system. The techniques may be implemented in hardware or software, or a combination of the two. Preferably, the techniques are implemented in computer programs executing on a digital signal processor that includes a processor and a storage medium readable by the processor (including volatile and non-volatile memory).

The coefficients of the SCISF may be computed and changed through a training process that may occur upon start up of the communication system and periodically during its operation. Using the training process, the coefficients of the SCISF are computed independently of the length of the cyclic prefix, the symbol length, and the frequency domain equalization characteristics of the system.

The SCISF is particularly effective in systems in which additive noise dominates intersymbol interference, or in which noise bleeding predominates. The SCISF reduces noise bleeding with a filter structure that is shorter than that obtained with other techniques. Consequently, the SCISF is less complex and its coefficients are easier to compute, which reduces system complexity and cost. The SCISF may be particularly well suited, for example, for very high-speed digital subscriber lines (VDSL) systems, which generally have low intersymbol interference and tend to suffer from noise bleeding.

In addition, dynamic selection of a cyclic prefix (CP) that maximizes the data throughput for a communication channel having a particular noise profile is provided. Dynamic selection of the CP allows the communication system to adapt to changing noise conditions in the communication channel.

In one aspect, generally, a primary impulse shortening filter is adapted in a multiple carrier communication system. A secondary impulse shortening filter is provided. An output signal of the secondary impulse shortening filter is compared to a reference signal to compute an error signal. Coefficients of the secondary impulse shortening filter are computed in an adaptive processor based on the error signal. Coefficients of the primary impulse shortening filter are replaced with coefficients of the secondary impulse shortening filter.

Embodiments may include one or more of the following features. An output signal of the primary impulse shortening filter may be decoded to form output data. The output data may be encoded to form the reference signal. A discrete Fourier transform may be applied to the output signal of the primary impulse shortening filter prior to decoding the output signal. An inverse discrete Fourier transform may be applied to the encoded output data in forming the reference signal.

A digital signal may be received from an output of an analog to digital converter. The digital signal may be input to the primary impulse shortening filter. The digital signal may be delayed. The delayed digital signal may be input to the secondary impulse shortening filter and the adaptive processor.

The encoded output data may be scaled with a set of scaling factors in forming the reference signal. The scaling factors may be determined by: measuring received noise power spectral density, computing a desired spectral response based on the measured noise power, and computing the scaling factors so that the coefficients computed in the adaptive processor provide the secondary impulse shortening filter with a spectral response that matches the desired spectral response. A discrete Fourier transform may be applied to the output signal of the primary impulse shortening filter prior to decoding the output signal. The noise power spectral density may be measured at an output of the discrete Fourier transform. An inverse discrete Fourier transform may be applied to the scaled, encoded output data.

In another aspect, an impulse shortening filter is adapted in a multiple carrier communication system having a spectrally constrained impulse shortening filter. An output signal of the spectrally constrained impulse shortening filter is compared to a reference signal to compute an error signal. Coefficients of the spectrally constrained impulse shortening filter are computed in an adaptive processor based on the error signal.

Embodiments may include one or more of the following features. The reference signal may be a predetermined signal stored in a memory in the communication system. A discrete Fourier transform may be applied to predetermined reference values to form transformed reference values. The transformed reference values may be scaled with a set of scaling factors to form scaled. An inverse discrete Fourier transform may be applied to the scaled values to form the reference signal.

A data signal may be received from an output of an analog to digital converter. The data signal may be input to the spectrally constrained impulse shortening filter and the adaptive processor.

In another aspect, a multiple carrier communication system includes a primary impulse shortening filter that receives an output signal of an analog to digital converter and accepts coefficients. A secondary impulse shortening filter receives the output signal of the analog to digital converter, outputs an output signal, and passes coefficients to the primary impulse shortening filter. A reference signal generator outputs a reference signal. A comparator compares the output signal and the reference signal and outputs a resulting error signal. An adaptive processor computes coefficients for the secondary impulse shortening filter based on the error signal.

Embodiments may include one or more of the following features. A discrete Fourier transform may receive an output signal of the primary impulse shortening filter. A decoder may receive the transformed output signal from the discrete Fourier transform. The reference signal generator may include an encoder that receives output data from the decoder. The reference signal generator may include a scaling filter that scales the output data from the encoder using a set of scaling factors. An inverse discrete Fourier transform may receive the scaled output signal from the scaling filer.

In another aspect, a multiple carrier communication system may include a spectrally constrained impulse shortening filter that receives an output signal of an analog to digital converter and accepts coefficients. A reference signal generator outputs a reference signal. A comparator compares the output signal and the reference signal and outputs a resulting error signal. An adaptive processor computes coefficients for the spectrally constrained impulse shortening filter based on the error signal.

Embodiments may include one or more of the following features. A memory may store the reference signal as a predetermined signal. A discrete Fourier transform may receive the reference signal from the memory. A scaling filter may scale the reference signal using a set of scaling factors. An inverse discrete Fourier transform may receive the scaled reference signal.

Other features and advantages will be apparent from the following description, including the drawings and the claims.

DESCRIPTION

Figure 1:
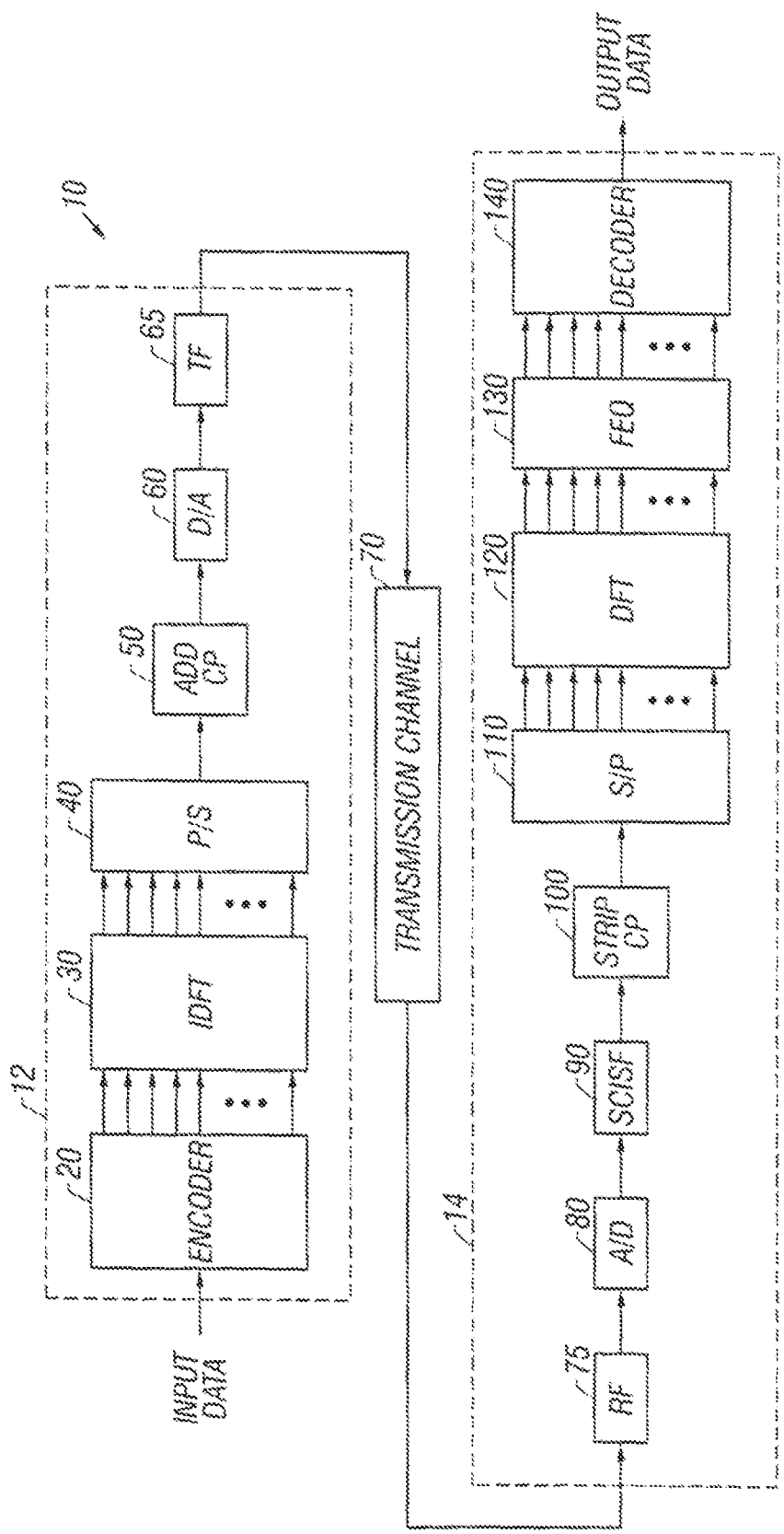
FIG. 1 is a block diagram of a discrete multi-tone communication system.

As shown in FIG. 1, a discrete multi-tone (DMT) communication system 10 has a transmitter 12 and a receiver 14. The transmitter 12 accepts an input data bit stream which passes through a constellation encoder 20. The encoder 20 divides the serial input bit stream into blocks of data. These blocks of data are further subdivided into smaller blocks corresponding to subchannels. Each of these smaller blocks are used to compute a complex value representing a constellation point. Each constellation point corresponds to a subsymbol. The subsymbols are then output by the encoder. Taken together, the subsymbols constitute a symbol.

The subsymbols are supplied to an inverse discrete Fourier transform (IDFT) 30, which may be implemented, for example, in a digital signal processor. The IDFT 30 outputs N time samples of a symbol. The time samples are processed by a parallel to serial converter 40 to form a single stream of time samples.

Following the parallel to serial converter 40, a prefix adder 50 adds a cyclic prefix to the beginning of each symbol to reduce intersymbol interference (ISI). Alternatively, the cyclic prefix may be added in the parallel to serial converter. After the cyclic prefix is added, the resulting signal passes through a digital-to-analog (D/A) converter 60 for transmission to the receiver 14 through a communication channel 70. An analog transmit filter 65 may be included following the D/A converter to band limit the transmitted signal.

At the receiver 14, the signal passes through an analog-to-digital (A/D) converter 80 and then through a spectrally constrained impulse shortening filter (SCISF) 90. A prefix stripper 100 strips the cyclic prefixes from the resulting symbols and a serial to parallel converter 110 divides the stream of time samples into parallel signal paths that form the inputs to a discrete Fourier transform (DFT) 120. The DFT 120 converts the time samples into subsymbols. A frequency domain equalization filter 130 equalizes the subsymbols. A decoder 140 converts the subsymbols into a data bits and outputs the resulting data. An analog receive filter 75 may be included prior to the A/D converter in order to band limit the received signal.

As discussed above, a cyclic prefix is added to each symbol prior to transmission through the communication channel to reduce the effects of ISI. The cyclic prefix is added by copying the last ν time samples from the end of a symbol and placing them at the beginning of the symbol. To eliminate ISI, the length of the cyclic prefix, ν, is chosen to be longer than the effective discrete-time impulse response (EDIR) of the channel. However, because the cyclic prefix constitutes redundant data, increasing the length of the cyclic prefix reduces the efficiency of the communication system. For example, in a system having N time samples per symbol and a cyclic prefix of ν time samples, the efficiency of the system will be reduced by a factor of N/(N+ν). Efficiency may be maximized either by minimizing ν or maximizing N. However, increasing N increases the complexity, latency and computational requirements of the system and at some point becomes impractical. Accordingly, it is desirable to minimize ν.

A spectrally constrained impulse shortening filter having an impulse response, g(n), may be employed in the receiver to minimize the length of the cyclic prefix by decreasing the EDIR of the effective communication channel, which includes the transmit and receive filters, the impulse shortening filter, and the physical transmission channel. The use of an impulse shortening filter is referred to as time domain equalization. Decreasing the EDIR allows a shorter cyclic prefix to be used without increasing ISI.

Figure 2:
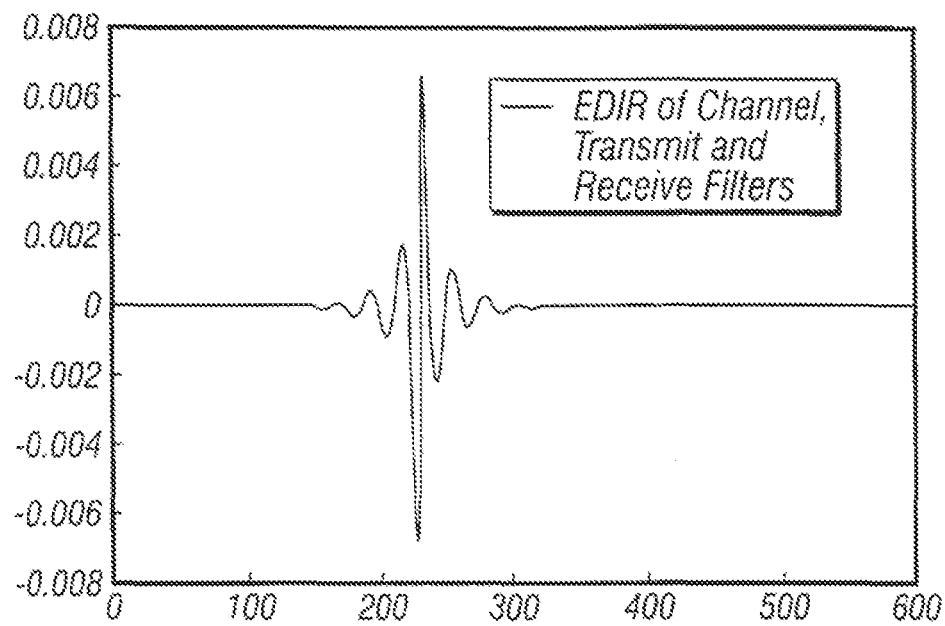
FIG. 2 is a plot of effective discrete-time impulse response (EDIR) of a communication channel including transmit and receive filters.
Figure 3:
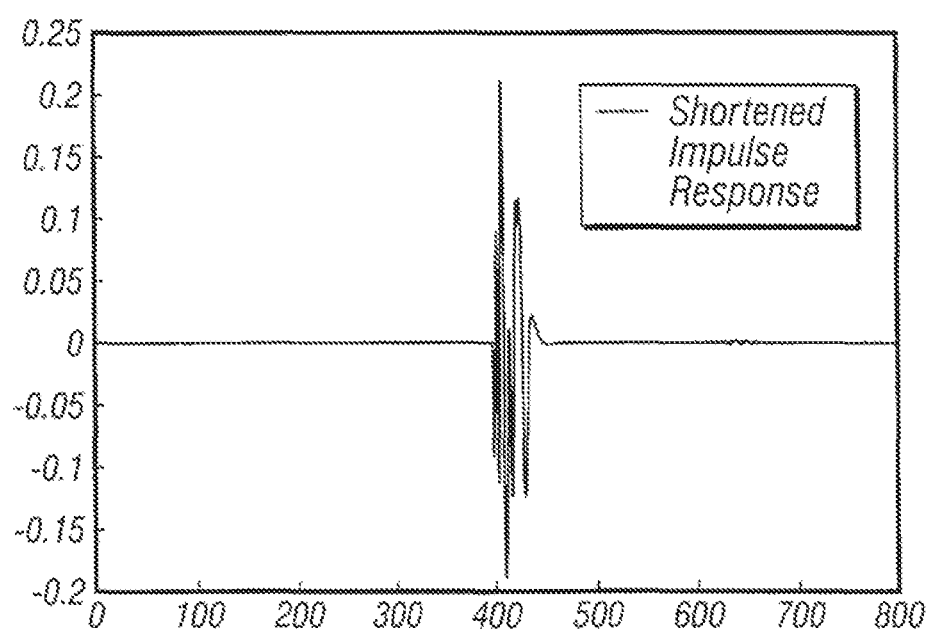
FIG. 3 is a plot of the shortened EDIR due to a spectrally constrained impulse shortening filter (SCISF).

FIG. 2 is a plot of the EDIR for a DMT test configuration having a communication channel that is 4500 feet in length and operates at a sampling frequency of 11.04 MHz (test loop 4, as described in "Very-high Speed Digital Subscriber Lines: System Requirements," Technical Report T1E.1.4/97-131R1, ANSI 1998). The EDIR includes the effects of a transmit filter, the communication channel and a receive filter. FIG. 3 shows the impulse response as shortened by the addition of an impulse shortening filter.

The impulse shortening filter is selected so that a significant part of the energy of the joint impulse response of the filter and the effective communication channel, g(n)*h(n), is confined to a region that is shorter in length than the length of the cyclic prefix. Some prior algorithms for computing g(n) considered only shortening the EDIR and did not consider the spectral characteristics of the resulting impulse shortening filter. Such filters often had deep nulls in some frequency bands, which rendered some of the corresponding subchannels useless.

Since increasing the length of the cyclic prefix reduces system efficiency, the receiver may dynamically compute an optimal length for the cyclic prefix and may send that information to the transmitter. For example, the receiver may compute a set of impulse responses for the impulse shortening filter based on a set of predetermined cyclic prefix lengths. The receiver then computes the system throughput for each particular cyclic prefix length. The length that maximizes system throughput is selected and the result of that selection is communicated to the transmitter. The transmitter then operates using the selected cyclic prefix length.

To avoid the possible attenuation of frequency bands, the spectral response of the impulse shortening filter is further required to have a spectral response that $|G(\omega)|$, meets a specified spectral constraint. A spectral constraint of the form $|G(\omega)H(\omega)|>_\tau$, where τ is a threshold, is sufficient to avoid nulls in the frequency response of the impulse shortening filter. However, it is possible to compute a spectral constraint or desired spectral response, $|G_d(\omega)|$, that provides additional performance improvements, such as reducing noise bleeding between subchannels. A spectrally constrained impulse filter is configured to have a spectral response that approximates the desired spectral response.

Figure 4:
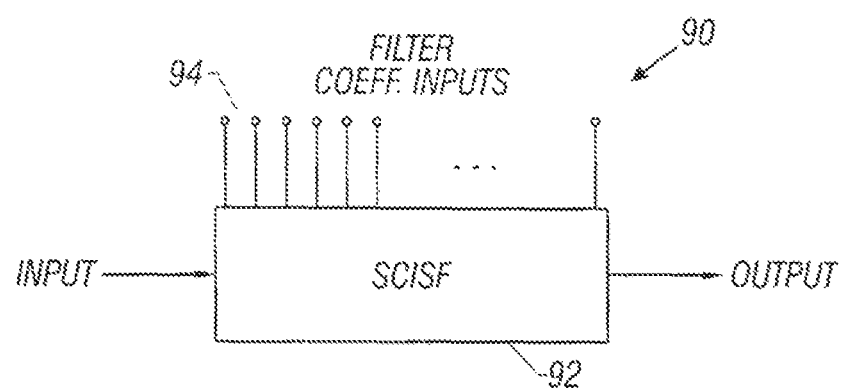
FIG. 4 is a block diagram of a SCISF.

As shown in FIG. 4, the spectrally constrained impulse shortening filter (SCISF) 90 may be implemented as a time domain digital filter, which has a digital filter structure 92 with a number of taps 94 or filter coefficient inputs for adjusting the filter response. The coefficients may be computed and supplied to the taps by a digital signal processor (DSP). Alternatively, the SCISF may be implemented entirely in software, i.e., within a DSP.

A desired spectral response may be applied to a received signal using a filter that is separate from the impulse shortening or time domain equalization (TEQ) filter. For example, an analog filter may be placed prior to the A/D converter. However, the adjustability of such a filter would be limited. As a further example, a digital filter could be added prior to the TEQ filter. Both of these configurations suffer the disadvantage that the TEQ filter may distort the desired spectral characteristics of the added filter. A filter also might be positioned after the TEQ filter, which would reduce noise bleeding, but might reduce the impulse shortening provided by the TEQ filter. Accordingly, the SCISF integrates the TEQ (i.e., impulse shortening) function with the desired spectral response in a single filter.

In summary, the filter characteristic, g(n), of the SCISF satisfies two conditions. First, the effective length of the convolution of the filter characteristic with the impulse response of the communication channel, g(n)*h(n), is less than a target length. Second, the cost function (error function) between the desired spectral response, $G_d(\omega)$, and the actual filter spectral response, $G(\omega)$, is minimized.

Figure 5:
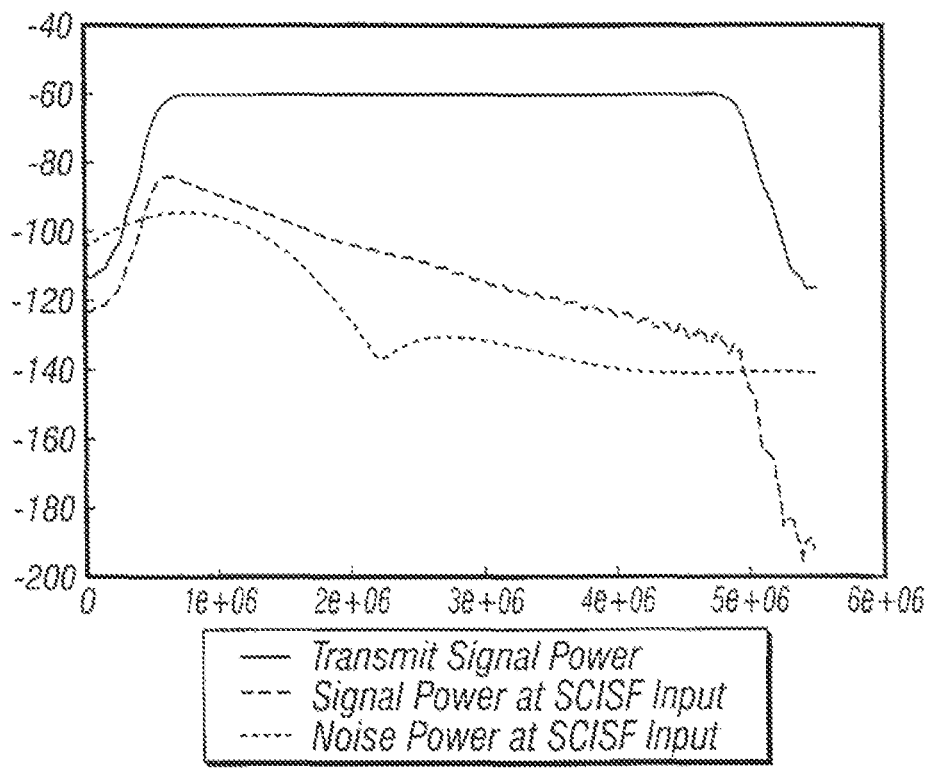
FIG. 5 is a plot of transmit signal power, signal power at SCISF input and noise power at SCISF input.
Figure 6:
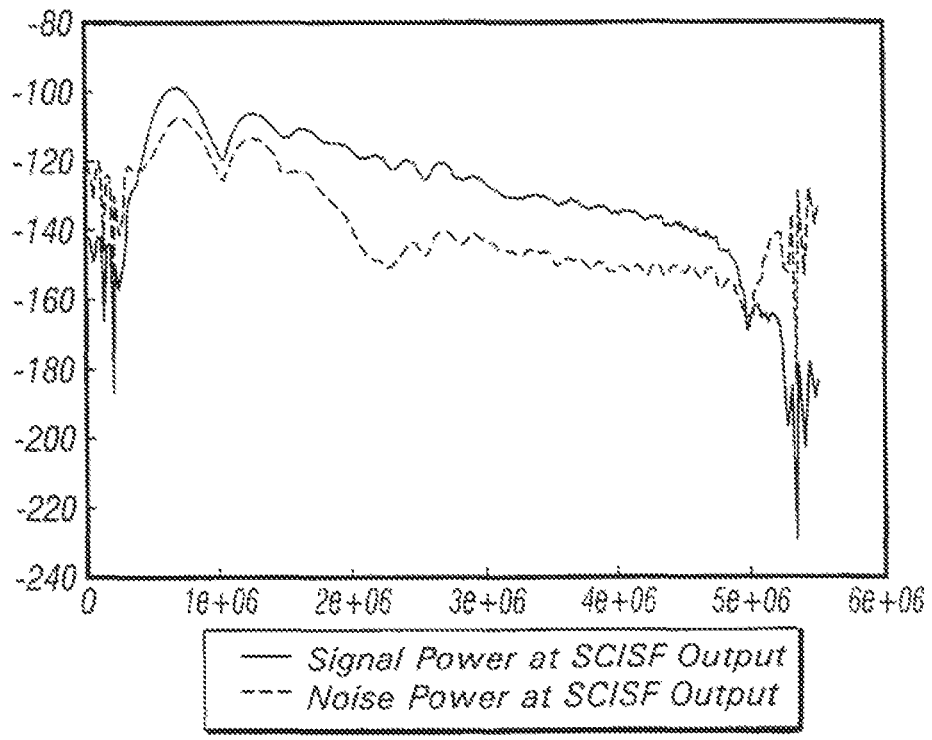
FIG. 6 is a plot of signal and noise power at the output of the SCISF.

The desired spectral response is an ideal filter characteristic that is selected to maximize the data bit throughput in the subchannels of a DMT system by reducing the impact of noise. There are many sources for noise in a DMT communication system, such as near-end cross-talk (NEXT), radio frequency interference (RFI) and noise generated in the communication channel (white noise). As shown in FIGS. 5 and 6, the noise spectral density is generally not uniform across the frequency band of the communication system. This non-uniformity contributes to the problem of noise bleeding, in which noise in one frequency band interfering with a signal in another frequency band.

Figure 7:
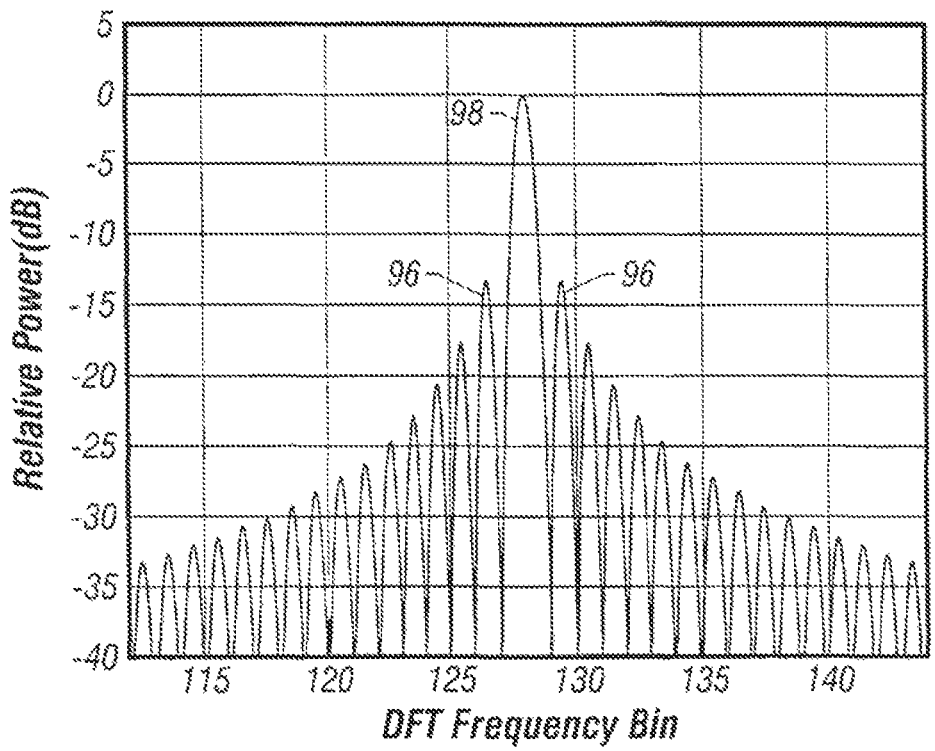
FIG. 7 shows the filter response of a discrete Fourier transform for one frequency band.

In general, noise bleeding is caused by sidelobes of filters in a DFT. FIG. 7 shows the filter response of a DFT for one frequency band or bin (i.e., bin 128). The first sidelobes (96) are only 13 dB below the main lobe (98). Therefore, noise located outside of bin 128, but within the first sidelobe of bin 128, i.e., approximately mid-way between bins 126 and 127, would appear in bin 128 with an attenuation of only 13 dB. Consequently, noisy subchannels in a DMT system may degrade the performance of non-noisy subchannels.

The desired spectral response is essentially a spectral constraint that attenuates noisy channels more than non-noisy channels. The signal and noise in the noisy channels are reduced equally, so the attenuation does not affect the signal-to-noise ratio in these channels. However, because the absolute noise level in the noisy channels is reduced, there is less noise available to enter the sidelobes of the non-noisy channels. Hence, the noise bleeding problem is minimized.

To determine the desired spectral response, the noise power spectral density (noise PSD) at the receiver must be known. The noise PSD may be determined, for example, by performing a periodigram on received data. This measurement is more complicated if a transmitter is transmitting, since the transmitted signal must be separated from the noise measurement. The noise PSD is determined by: (i) slicing the received constellation of subcarriers after the DFT to determine the nearest valid constellation point; (ii) determining an error signal based on the difference between the received constellation point and the valid constellation point; (iii) performing an IDFT on the error signal; and (iv) generating a periodigram (with windowing) from the error signals. The noise PSD may then be determined from the periodigram.

An example of a noise PSD characteristic for a DMT communication system is shown in FIG. 5 (test loop 4, as described in "Very-high Speed Digital Subscriber Lines: System Requirements," *Technical Report T1E1.4/97-131R1*, ANSI 1998). The transmit signal power is measured at the output of the transmit filter in the transmitter. The signal and noise PSD plots shown in FIG. 5 are measured at the input of the A/D converter in the receiver, which is prior to the SCISF.

Measured noise PSD is used by a digital signal processor (DSP) to compute a desired spectral response, $G_d(\omega)$, using the algorithm described below. Alternatively, the inverse of the noise PSD may be used as an approximation for the desired spectral response. A spectral response, $G(\omega)$, is then determined for the SCISF that minimizes the error between the spectral response of the SCISF and the desired spectral response. A set of filter coefficients may then be generated to configure the SCISF to the determined characteristic. These calculations may be done periodically to adjust the performance of the communication system. Frequency domain equalization coefficients and symbol synchronization may also be adjusted based on these calculations.

Figure 8:
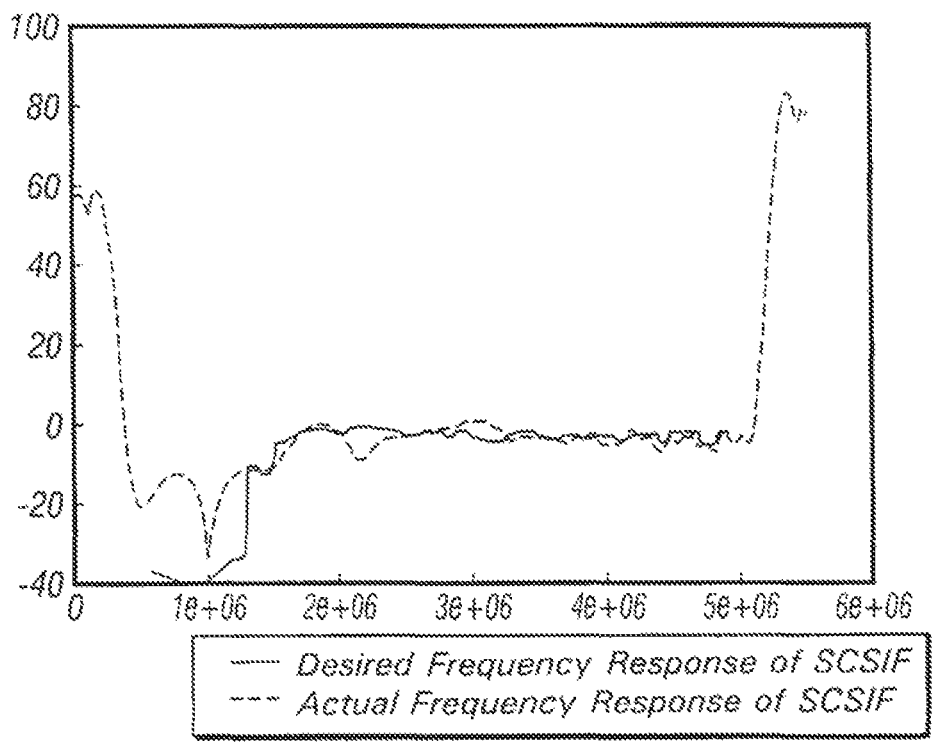
FIG. 8 is a plot of the desired spectral response of the SCISF, $G_d(\omega)$, versus the actual frequency response, $G(\omega)$.

FIG. 8 is a plot of the desired spectral response of the SCISF, $G_d(\omega)$, versus the actual frequency response, $G(\omega)$. The difference between the responses is only a few dB. FIG. 6 shows the signal and noise PSD at the output of the SCISF.

Figure 9:
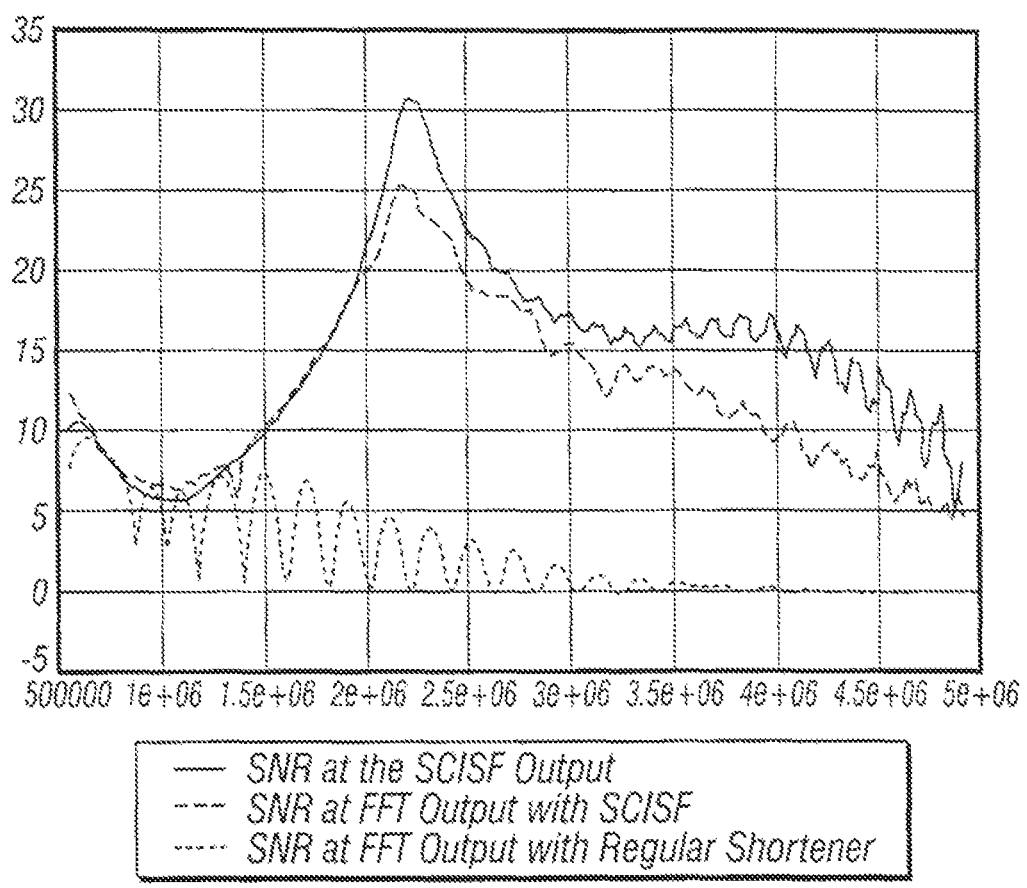
FIG. 9 is a plot of signal-to-noise ratio at the output of the SCISF, the output of the DFT with the SCISF and the output of the DFT without the SCISF.

FIG. 9 shows the dramatic effect of the SCISF on system performance. Without the SCISF (i.e., using a filter that provides only impulse shortening), the signal-to-noise ratio (SNR) decreases significantly at the output of the Fourier transform (i.e., FFT or DFT) to less than about 7 dB. This decrease is due, in large part, to noise bleeding caused by the sidelobes of the Fourier transform. By contrast, with the SCISF, the SNR at the output of the Fourier transform tracks the SNR at the output of the SCISF within a few dB. Overall, the SCISF provides an improvement in SNR.

The desired spectral response of the SCISF, $G_d(\omega)$ and the actual frequency response, $G(\omega)$, are derived from an energy constraint for the SCISF, i.e., the desired spectral response must localize the energy of the effective impulse response within a desired frequency band. The energy constraint is combined with a desired spectral response based on the measured noise power spectral density. The resulting cost function (or error function) is then minimized to obtain a practical filter characteristic for the SCISF. This process is presented in detail below.

In the following derivation, all vectors are column vectors by default. Vectors are denoted by bold lower case letters (e.g., t). The size $m_t$ of a vector t, is written $t(m_t)$. The components of a vector are denoted by lower case letters, e.g., $t(m_t) = [t_0 \ldots t_{m_t-1}]^T$. The convolution of length $m_t + m_h - 1$ of vectors $t(m_t)$ and $h(m_h)$ is denoted t*h. The Toeplitz matrix of a vector $t(m_t)$, $t_{(m:n)} \triangleq [t_m \ldots t_n]^T$, is written $T_{(m:n)}^{m_x}$, and $T_{(m:n)}^{m_x} x = (t*x)_{(m:n)}$. The Discrete Time Fourier Transform (DTFT) of a vector t may be represented as:

$$T(\omega) = \sum_{n=0}^{m_t-1} t_n e^{-j\omega n}. \quad (1)$$

The EDIR of the channel and the impulse response of the SCISF are expressed as $h(m_h)$ and $g(m_g)$, respectively. The cyclic prefix has a length of $m_c$ per symbol. The energy of the effective impulse response must be localized to a contiguous region of target length $m_l$, where $m_l < m_c$, while satisfying a spectral constraint. The energy criterion to be satisfied by the SCISF may be written as:

$$\frac{\|(g*h)_{(m:m+m_l-1)}\|^2}{\|(g*h)\|^2} \geq \alpha \quad (2)$$

for some $0 \leq m \leq m_g + m_h - 2$ and some $0 < \alpha < 1$. Defining the set $S^m$ as $$s^m = \left\{ g \in R^{m_g} : \frac{\|(g*h)_{(m:m+m_l-1)}\|^2}{\|(g*h)\|^2} \geq \alpha \right\} \quad (3)$$

the impulse response of the SCISF must belong to $S^m$ for some m.

Let $\omega_1, \ldots, \omega_N$ be the location of the sub-carriers in the frequency domain. The spectral constraint may be applied by selecting $g \in S^m$, so that the cost function $$J(g) \triangleq \sum_{i=1}^{N} (|G(\omega_i)| - G_d(\omega_i))^2 \quad (4)$$

is minimized for the desired spectral response $G_d(\omega)$.

Typically, this optimization would have to be repeated for all possible m to select the filter impulse response, g, that achieves the lowest possible value of J. However, as discussed below, optimization may be limited to a few well chosen values of m.

The determination of the filter impulse response may be done in two stages. First, the desired magnitude frequency response $G_d(\omega)$ of the impulse shortening filter g over the bins used by the DMT system is obtained. Second, J is optimized over $S^m$ for a specific value of m.

To determine the desired spectral response $G_d(\omega)$, it is necessary to use expressions for the signal to noise ratios observed in the various frequency bins at the output of the DFT in the receiver. The DMT system has M tones (subcarriers), N of which (those from $M_1$ through $m_2$) are used, and the communication channel has an analog frequency response $H_c(f)$. The analog noise power spectral density observed at the input of the receiver A/D is $S_\eta(f)$. Prior to conversion in the A/D converter, the received analog signal may be filtered by an anti-aliasing filter with transfer function $H_a(f)$. The EDIR in the absence of the impulse shortening filter is h(n). After the A/D converter, the signal is fed into the impulse shortening filter with an impulse response of g(n). The impulse shortening filter ensures that (h(n)*g(n)) is shorter in length than the cyclic prefix. GM is the discrete time Fourier transform of g(n). Under these conditions, the expected signal energy $_\mu(k)$ observed in bin k at the output of the length-2M receiver DFT is given by:

$$\mu(k) = C_1 D_k \left| H\left(\frac{\pi k}{M}\right) \right|^2 \left| G\left(\frac{\pi k}{M}\right) \right|^2; \quad (5)$$

$$H(\omega) = H_c\left(\frac{\omega}{2\pi T}\right) H_a\left(\frac{\omega}{2\pi T}\right)$$

where $C_1$ is a constant, 1/T the sampling frequency and $D_k$ the transmitted power in bin k. The noise power $_\eta(k)$ in bin k is:

$$\eta(k) = C_2 \left[ S_\eta\left(\frac{\omega}{2\pi T}\right) |G(\omega)|^2 \left| H_a\left(\frac{\omega}{2\pi T}\right) \right|^2 \right] * \left[ \frac{\sin^2(M\omega)}{\sin^2\left(\frac{\omega}{2}\right)} \right] \Bigg|_{\omega=\frac{\pi k}{M}} \quad (6)$$

where $C_2$ is another constant and * denotes the convolution. Assuming that the noise in the bands corresponding to unused tones is sufficiently attenuated by the anti-alias filter, $_\eta(k)$ is approximately equal to:

$$\eta(k) \approx \quad (7)$$

$$C_3 \sum_{l=M_1}^{M_2} S_\eta\left(\frac{l}{2MT}\right) \left| G\left(\frac{\pi l}{M}\right) \right|^2 \left| H_a\left(\frac{l}{2MT}\right) \right|^2 (\alpha(k-l) + \alpha(2M-k-l)),$$

where $_\alpha(n)$ is defined as:

$$\alpha(n) = \int_{-\frac{\pi}{2M}}^{\frac{\pi}{2M}} \left[ \frac{\sin^2\left(M\left(\frac{\pi n}{M} - \lambda\right)\right)}{\sin^2\left(\frac{1}{2}\left(\frac{\pi n}{M} - \lambda\right)\right)} \right] d\lambda, \quad (8)$$

$M_1 \ldots M_2$ are the used tones and $C_3$ another constant. Defining x to be the vector of frequency magnitudes to be solved for as:

$$x \triangleq \begin{bmatrix} \left| G\left(\frac{\pi M_1}{M}\right) \right|^2 \\ \vdots \\ \left| G\left(\frac{\pi M_2}{M}\right) \right|^2 \end{bmatrix}, \quad (9)$$

the SNR in bin k can be seen to be of the form $$\frac{b_k x_k}{a_k^T x},$$

in which $b_k$ are scalars and $a_k$ are vectors.

To determine the desired spectral response, x is chosen to maximize the bit throughput. Approximating the capacity of bin k by $\sqrt{SNR(k)}$, the optimal spectral profile is obtained by minimizing the cost function F, where:

$$F(x) = -\sum_{k=M_1}^{M_2} \sqrt{\frac{b_k x_k}{a_k^T x}}. \quad (10)$$

This minimization is performed over:

$$X = \{x \in R^N : \|x\| = 1, x_i \geq 0, 1 \leq i \leq N \quad (11)$$

and can be accomplished by any one of a variety of constrained optimization strategies, as discussed in Bertsekas, *Nonlinear Programming*, Athena Scientific, Belmont, Mass., 1995. A median filter may be applied to the output of the optimization algorithm to smooth the resulting desired spectral response.

Let $A \triangleq H_{(0:m_h+m_g-2)}^{m_g}$ and $B \triangleq H_{m:m+m_l-1)}^{m_g}$. The energy constraint in equation (3) can be written as:

$$S^m = \left\{ g \in R^{m_g} : \frac{g^T B^T B g}{g^T A^T A g} \geq \alpha \right\}. \quad (12)$$

Matrix A has full column rank, since it corresponds to a full convolution, so $R_A \triangleq A^T A$ is invertible. Let $R_B \triangleq B^T B$. Defining $q = R_A^{0.5} h$, where $R_A^{0.5}$ is the square root of the positive definite matrix $R_A$, the energy constraint set can be written in terms of q as:

$$Q \triangleq \left\{ q \in R^{m_g} : \frac{q^T R_A^{-0.5} R_B R_A^{-0.5} q}{q^T q} \geq \alpha \right\}. \quad (13)$$

The next step is to reduce the dimensionality, i.e., the number of variables to search over in the optimization process. For example, in a video digital subscriber line(VDSL) application, an impulse shortening filter having a few hundred taps may be required. Searching over a variable space so large is difficult and impractical. Instead, the optimization is performed by searching over a cleverly chosen lower-dimensional subset of the variable space. This simplification in the optimization process may be done without significant reduction in the performance of the communication system.

The reduction in dimensionality is accomplished by a transformation of variables. Let $C \triangleq R_A^{-0.5} R_B R_A^{-0.5}$. Let $S = U\Sigma U^T$ be the singular-value decomposition of C, where $\Sigma$ is a diagonal matrix whose (i, i)th element is $\sigma_i$ and where the $\sigma_i$ are arranged in descending order. If $\sigma_1 < \alpha$, there is no feasible solution corresponding to delay in. If $\sigma_1 \geq \alpha$, let $$U = [U_1 U_2]; \quad (14)$$

$$\Sigma = \begin{bmatrix} \Sigma_1 & 0 \\ 0 & \Sigma_2 \end{bmatrix},$$

where $U_1$ has size $(m_g, m_d)$ and $\Sigma_1$ has size $(m_d, m_d)$ for some $m_d$. These equations define the dimension of the range space of the matrix $U_1$, over which the search is confined. The dimension $m_d$ may be chosen either to include all $\sigma_i$ greater than some threshold $\beta$, $\beta < \alpha$, or $m_d$ may be a fixed number. Simulations indicate that $m_d$ can be less than $m_g$ by more than an order of magnitude without significantly affecting communication system performance.

The dimensionality reduction is achieved by a further transformation of variables: $q = U_1 v$. The energy constraint set now becomes:

$$V \triangleq \left\{ v \in R^{m_d} : \frac{v^T \Sigma_1 v}{v^T v} \geq \alpha \right\} = \{v \in R^{m_d} : v \neq 0, \alpha \|v\|^2 - v^T \Sigma_1 v \leq 0 \quad (15)$$

using the identity $D_1^T C U_1 = \Sigma_1$.

Next, the cost function is expressed in terms of v. For a particular v, the corresponding g is given by $g = R_A^{-0.5} U_1 v$, which leads to:

$$\begin{bmatrix} G(\omega_1) \\ \vdots \\ G(\omega_N) \end{bmatrix} = Fg; \quad (16)$$

$$F = \begin{bmatrix} 1 & e^{-j\omega_1} & e^{-j2\omega_1} & \ldots & e^{-j(m_g-1)\omega_1} \\ \vdots & \vdots & \vdots & \vdots & \vdots \\ 1 & e^{-j\omega_1} & e^{-j2\omega_N} & \ldots & e^{-j(m_g-1)\omega_N} \end{bmatrix}$$

Let $D \triangleq F R_A^{-0.5} U_1$. Let $D^R \triangleq \text{real}(D)$ and $D^I \triangleq \text{imag}(D)$. $D^R$ and $D^I$ are real matrices of size $(N, m_d)$. Let $d_{R,n}^T$, $1 \leq n \leq N$ and $d_{I,n}^T$, $1 \leq n \leq N$ be the rows of $D^R$ and $D^I$, respectively. Then:

$$|G(\omega_n)| = \sqrt{(d_{R,n}^T v)^2 + (d_{I,n}^T v)^2}$$

$$= \sqrt{v^T (d_{R,n} d_{R,n}^T + d_{I,n} d_{I,n}^T) v}$$

$$= \sqrt{v^T \Gamma_n v}$$

where $\Gamma_n \triangleq d_{R,n} d_{R,n}^T + d_{I,n} d_{I,n}^T$. These definitions result in:

$$J_o(v) \triangleq j(g(v)) = \sum_{n=1}^{N} \left( \sqrt{v^T \Gamma_n v} - G_d(\omega_n) \right)^2 \quad (17)$$

The gradient and Hessian of $J_o$ are:

$$\nabla_{J_o}(v) = \sum_{n=1}^{N} 2 \left( 1 - \frac{G_d(\omega_n)}{\sqrt{v^T \Gamma_n v}} \right) \Gamma_n v \quad (18)$$

$$H_{J_o}(v) = \sum_{n=1}^{N} 2 \left[ \left( 1 - \frac{G_d(\omega_n)}{\sqrt{v^T \Gamma_n v}} \right) \Gamma_n + \frac{G_d(\omega_n)}{\left( \sqrt{v^T \Gamma_n v} \right)^2} \Gamma_n v v^T \Gamma_n \right] \quad (19)$$

The projection $P_v(y)$ of any $y \in R^{m_d}$ on to V is defined to be $$P_v(y) \triangleq \arg\min_{v \in V} \|y - v\|^2 \quad (20)$$

To develop an algorithm to optimize the cost function $J_o$ over V, an expression must be derived for $P_v(y)$. There is no closed-form expression for this projection operator, however there is a very efficient algorithm to compute it. If $y \in V$, $P_v(y) = y$. If not, the projection onto V is the same as the projection on to its boundary, defined by:

$$\text{boundary}(V) \triangleq \{v \in R^{m_d} : v \neq 0, \alpha \|v\|^2 - v^T \Sigma_1 v = 0 \quad (21)$$

The latter may be accomplished using LaGrange multipliers as follows. Defining a modified cost function S as:

$$S(v) \triangleq \|y - v\|^2 + \mu(\alpha \|v\|^2 - v^T \Sigma_1 v) \quad (22)$$

The equation $\nabla_S(v) = 0$ must be solved on the boundary of V. This reduces to the following simultaneous equations:

$$[(1+\mu\alpha)I - \mu\Sigma_1]v = 0 \quad (23)$$

$$\alpha \|v\|^2 - v^T \Sigma_1 v = 0 \quad (24)$$

Solving for v in terms of $\mu$ from (23) and substituting in (24), the following equation is obtained for $\mu$:

$$y^T \text{diag}\left( \frac{\alpha - \sigma_i}{[1 + \mu(\alpha - \sigma_i)]^2} \right) y = 0 \quad (25)$$

Equation (25) may be written as a polynomial equation of order $2m_d$ in $\mu$. The polynomial equation must be solved for the real and positive roots, which may be done using one of the variety of efficient root-finding algorithms in the literature. One of the real, positive roots must be chosen by enumeration so that, when substituted into the expression for v, it leads to the smallest $\|y-v\|^2$.

Since the gradient and Hessian of the cost function $J_o$ and the projection operator onto V are available, the optimization can be done very efficiently. For example, the penalty method may be used, as described in Bertsekas, *Nonlinear Programming*, Athena Scientific, Belmont, Mass., 1995, or an iterative strategy consisting of gradient descent followed by projection onto V. Both techniques have been tested and perform well.

The SCISF may be configured, by determining the filter coefficients during a training or adaptation period. The SCISF filters the output $\{y_k\}$ of the receiver A/D 80. The coefficients are selected using an algorithm that minimizes the squared error between a reference sequence $\{u_k\}$ generated by the receiver and the output of the SCISF $\{\hat{u}_k\}$. The SCISF may be a finite impulse response (FIR) filter or an infinite impulse response (IIR) filter. The SCISF may be trained following activation of the communication system or periodically during operation of the system to compensate for variations in the channel noise profile.

The training may be performed using a variation of one of the classical adaptive algorithms, such as least mean squares (LMS), normalized LMS, or recursive least squares (RLS). For example, the following algorithm is a version of the normalized LMS algorithm in which $b_0, \ldots, b_N$ and $a_1, \ldots, a_N$ are the FIR and IIR parts of a SCISF having an impulse response, g. The z-transform G(z) is:

$$G(z) = \frac{b_0 + b_1 z^{-1} + \ldots + b_N z^{-N}}{1 - a_1 z^{-1} - \ldots - a_N z^{-N}} \qquad (26)$$

The adaptation of coefficients $a_i$ and $b_i$ is defined in the following equations, in which $a_i(k)$ and $b_i(k)$ are the values of these coefficients during the $k^{th}$ iteration. The parameter $\mu$ is a predetermined constant with a value of 0.4.

$$\hat{u}_k = \sum_{i=0}^{N} b_i(k) y_{k-i} + \sum_{j=1}^{N} a_j(k) \hat{u}_{k-j} \qquad (27)$$

$$\alpha_k = [b_0(k), \ldots, b_N(k)] \qquad (28)$$

$$\beta_k = [a_1(k), \ldots, a_N(k)] \qquad (29)$$

$$d_k = [y_k, y_{k-1}, \ldots, y_{k-N}] \qquad (30)$$

$$c_k = [\hat{u}_{k-1}, \hat{u}_{k-2}, \ldots, \hat{u}_{k-N}] \qquad (31)$$

$$e_k \stackrel{\Delta}{=} u_k - \hat{u}_k \qquad (32)$$

$$\alpha_{k+1} = \alpha_k + \mu \frac{e_k d_k}{\|d_k\|^2} \qquad (33)$$

$$\beta_{k+1} = \beta_k + \mu \frac{e_k c_k}{\|c_k\|^2} \qquad (34)$$

Figure 10:
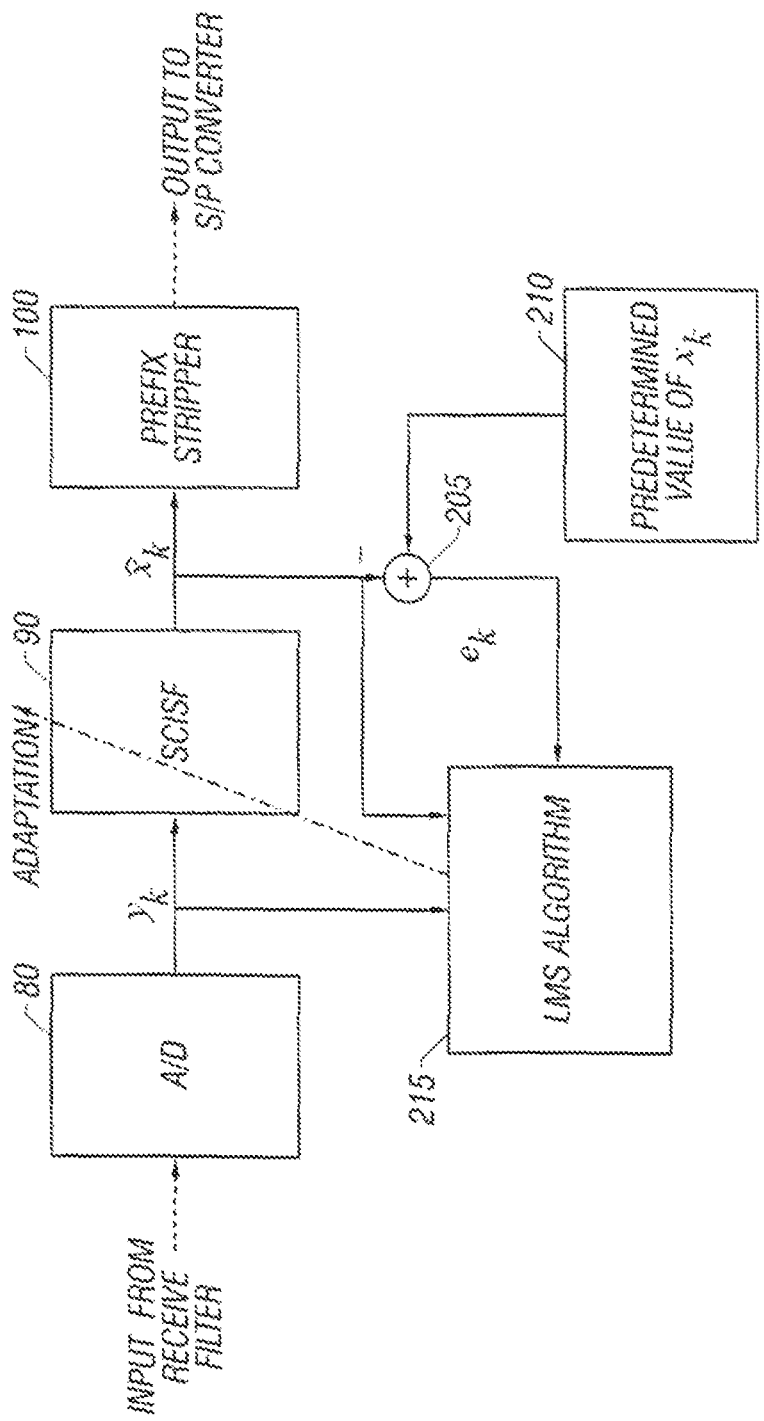
FIG. 10 is a block diagram of a system for adapting a spectrally constrained impulse shortening filter in an initial training process.

In a first embodiment, the coefficients of the SCISF are determined during an initial training period following the activation of the communication system using the LMS algorithm described above. A predetermined sequence of bits $x_k$ is input to the transmitter 12. The sequence of bits results in a sequence of real numbers $\{x_k\}$ at the input of the D/A 60. As shown in FIGS. 1 and 10, the transmitted signal is filtered and noise-corrupted by the transmission channel 70, resulting in a received sequence $\{y_k\}$ at the output of the A/D 80 in the receiver 14. The SCISF 90 filters and transforms the received sequence $\{y_k\}$ into an output sequence $\{\hat{x}_k\}$. The output sequence $\{\hat{x}_k\}$ is compared (in a signal comparator 205) to the predetermined sequence $x_k$, which is stored in memory 210 in the receiver. The comparison results in an error signal $e_k$ that is input to the LMS algorithm processor 215 along with sequence $\{\hat{x}_k\}$.

The training process determines coefficients for the SCISF so that the output $\{\hat{x}_k\}$ matches the predetermined sequence $\{x_k\}$ as closely as possible in a least squares sense, i.e., the mean square error between the output and the predetermined sequence is minimized. During the training process, the coefficients of the SCISF converge to values that enable the SCISF to reduce ISI and additive noise. The resulting SCISF matches $P_1(\omega)$ in the frequency domain in a least squares sense, where:

$$P_1(\omega) = \frac{S_x(\omega) H*(\omega)}{S_x(\omega) |H(\omega)|^2 + S_\eta(\omega)}. \qquad (35)$$

In the equation above, $S_x(\omega)$ is the power-spectral density at the input of the transmitter D/A 60, $S_\eta(\omega)$ is the power spectral density of the additive noise at the output of the A/D 80, and $H(\omega)$ is the frequency response of the effective discrete-time impulse response (EDIR) of the transmission channel 70, transmit filter 65, and receive filter 75 measured between the input of the transmitter D/A 60 and the output of the receiver A/D 80.

Upon completion of the initial training of the SCISF, the SCISF coefficients are fixed and the frequency domain equalizer (FEQ 130) of the receiver is trained using standard techniques for DMT receivers. Following the training of the FEQ, the SCISF can be periodically trained or adapted during operation of the communication system. Since it is not efficient to repeatedly transmit a predetermined bit sequence during operation of the communication system, the periodic training process uses transmitted communication data to generate the reference and output sequences, as described below.

Figure 11:
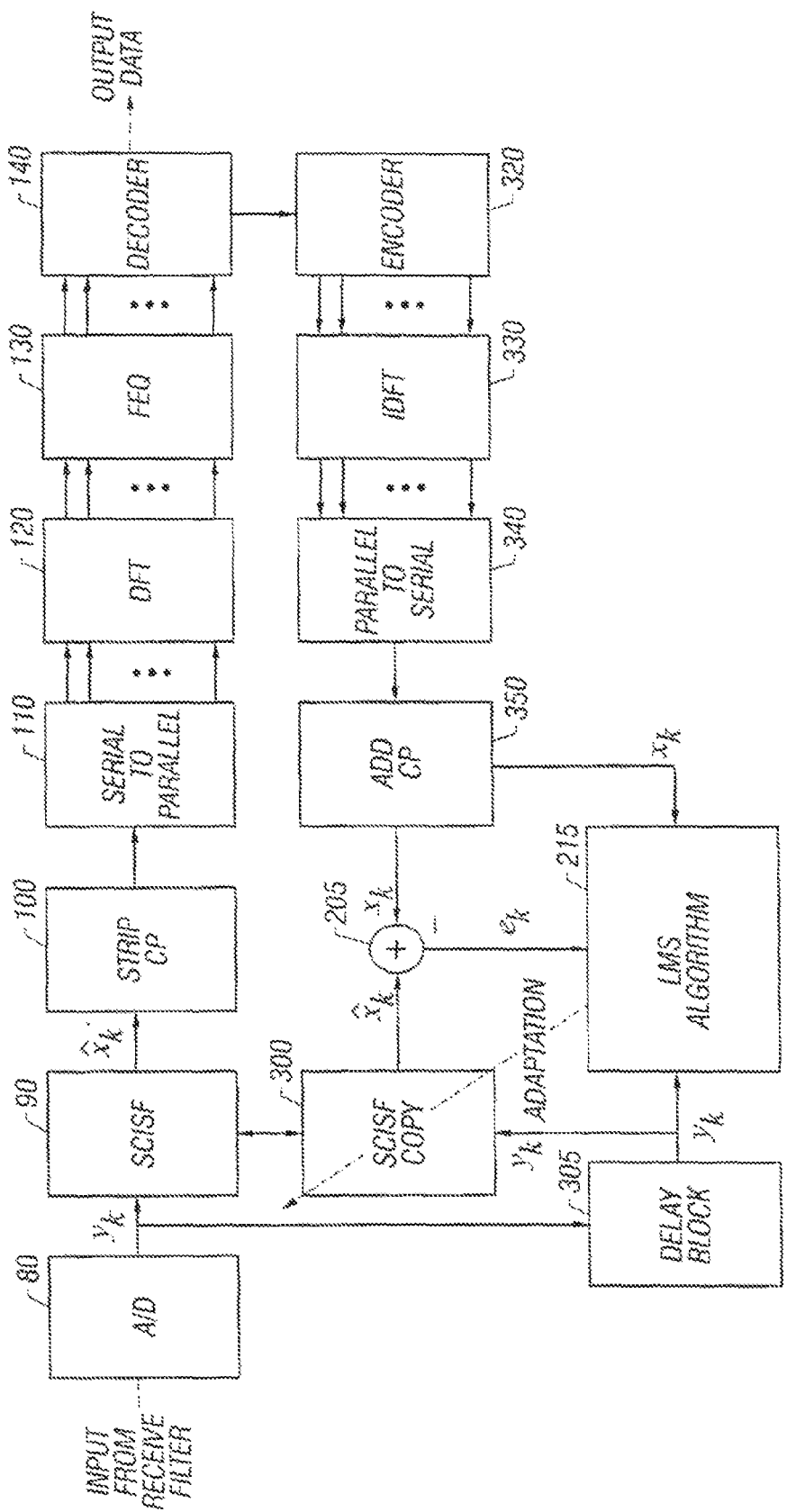
FIGS. 11 and 12 are block diagrams of a system for adapting a spectrally constrained impulse shortening filter in an periodic or continuous training process.

During operation of the communication system, a sequence of communication data bits $x_k$ is input to the transmitter 12 (see FIG. 1). The sequence of data bits results in a sequence of real numbers $\{x_k\}$ at the input of the D/A 60. As shown in FIGS. 1 and 11, the transmitted signal is filtered and noise-corrupted by the transmission channel 70, resulting in a received sequence $\{y_k\}$ at the output of the A/D 80 in the receiver 14. The SCISF 90 filters and transforms the received sequence $\{y_k\}$ into an output sequence $\{\hat{x}'_k\}$.

The received sequence $\{y_k\}$ is also input to a delay 305 and then to a secondary SCISF 300 that has the same coefficients as the primary SCISF 90 following the initial training. Such a configuration allows periodic training to be performed without disruption to the operation of the communication system. The secondary SCISF 300 is periodically or continuously trained using an algorithm similar to that used for the initial training. The new coefficients of the secondary SCISF 300 are periodically copied to the primary SCISF 90.

In an initial training process, the output sequence $\{\hat{x}_k\}$ of the secondary SCISF 300 would be compared (in a signal comparator 205) to a predetermined sequence $x_k$ stored in memory. However, as discussed above, a sequence of data communication bits is used as a reference sequence for training rather than a predetermined sequence. As such, the receiver must have a way of generating a reference signal to compare to the output of the SCISF.

To compute the reference sequence, the receiver essentially duplicates the encoding and modulation processes of the transmitter using the output of the decoder 140. Because the initial training has already been performed, the SCISF 90 output $\{\hat{x}'_k\}$ matches the predetermined sequence $\{x_k\}$ closely and ISI and additive noise, are minimized. Hence, the data output of the decoder 140 closely matches the transmitted sequence of communication data bits $x_k$. The data bits are input to an encoder 320, an IDFT 330, a parallel to serial converter 340, and a prefix adder 350 similar to those in the transmitter. The output sequence {x_k} of this chain is input to the LMS algorithm processor 215 and used as a reference sequence in the training algorithm.

The output sequence {x̂_k} of the secondary SCISF 300 is compared (in a signal comparator 205) to the reference sequence {x_k}, which is output by the encoding/modulation chain (320, 330, 340 and 350). As noted above, the received sequence {y_k} passes through a delay 305 before being input to the secondary SCISF 300. The delay 305 compensates for the processing delay in the demodulation/decoding chain and the encoding/modulation chain. The comparison results in an error signal e_k that is input to the LMS algorithm processor 215. The training process determines coefficients for the secondary SCISF 300 so that the output {x̂_k} matches the reference sequence {x_k} as closely as possible in a least squares sense, i.e., the mean square error between the output and the reference sequence is minimized. Periodically, the coefficients of the secondary SCISF 300 are copied to the primary SCISF 90.

Figure 12:
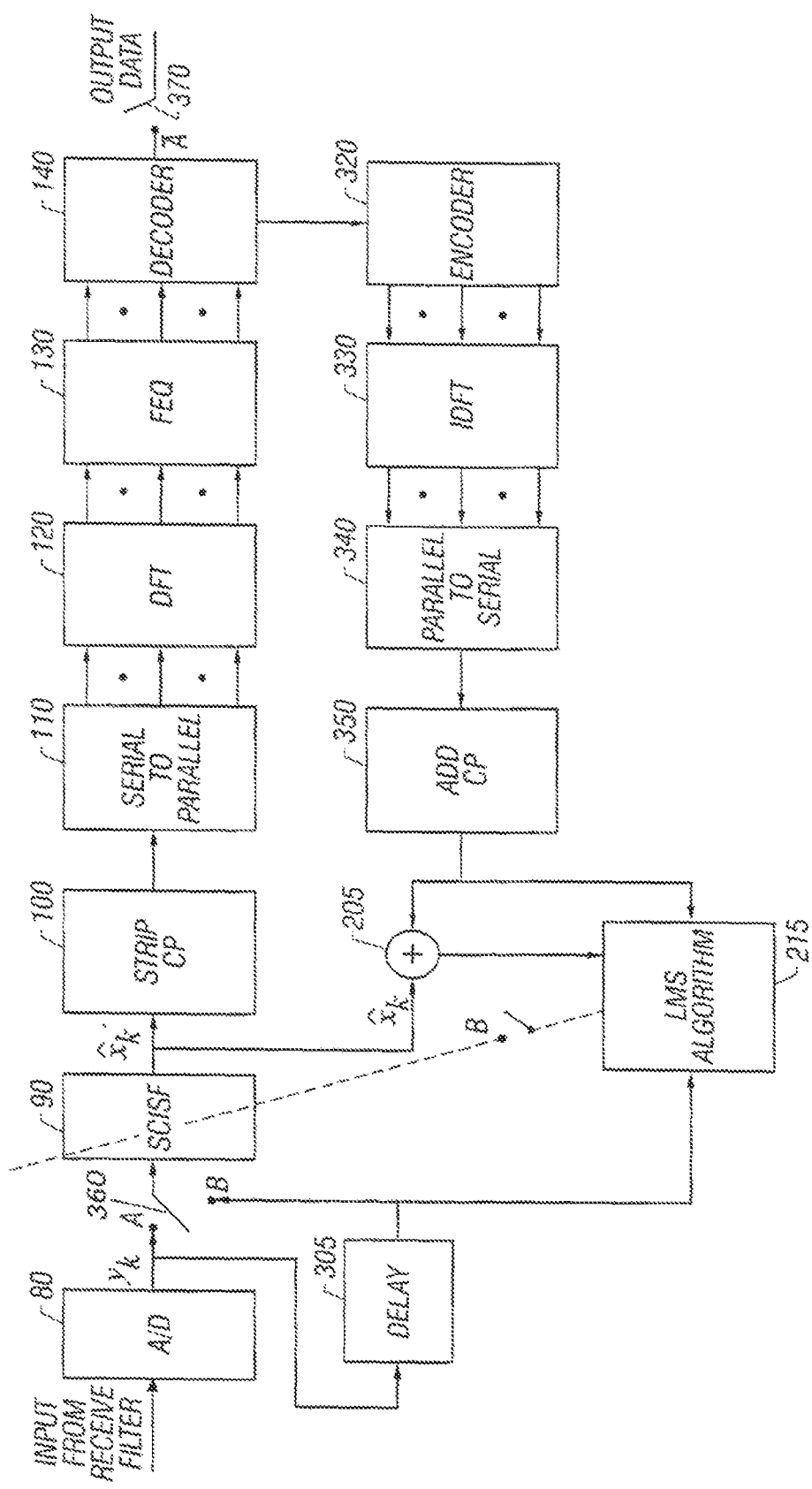

Alternatively, as shown in FIG. 12, the periodic training may be performed with a single SCISF 90. In this configuration, a received sequence {y_k} is output by the A/D 80 in the receiver 14. The SCISF 90 filters and transforms the received sequence {y_k} into an output sequence {x̂'_k}. The received sequence {y_k} is also input to a delay 305. After the received sequence {y_k} passes through the SCISF 90, a data switch 360 is changed from position A to position B, allowing the delayed received sequence to make a second pass through the SCISF 90. An output switch 370 also may be opened, so that data is not output during the training process. In addition, the SCISF coefficients are controlled by the LMS algorithm during the training process.

A reference sequence is computed as in the configuration of FIG. 11. The data bits are input to an encoder 320, an IDFT 330, a parallel to serial converter 340, and a prefix adder 350. The resulting reference sequence {x_k} is input to the LMS algorithm processor.

The output sequence {x̂_k} of the second pass through the SCISF 90 is compared (in signal comparator 205) to the reference sequence. As noted above, the received sequence {y_k} passes through a delay 305 before being input to the SCISF 90 for the second pass. The delay 305 compensates for the processing delay in the demodulation/decoding chain and the encoding/modulation chain. The comparison results in an error signal e_k that is input to the LMS algorithm processor 215. The training process determines coefficients for the SCISF 90 so that the output {x̂_k} matches the reference sequence {x_k} as closely as possible in a least squares sense, i.e., the mean square error between the output and the reference sequence is minimized. The coefficients of the SCISF 90 then are updated to the coefficients determined in the training process.

In a second embodiment, the SCISF 90 coefficients are chosen so that the frequency response of the SCISF matches a desired spectral response $G_d(\omega)$ that seeks to minimize the effects of noise-bleeding and maximize system bit throughput. The desired spectral response $G_d(\omega)$ is determined based on the signal-to-noise ratios observed in the various frequency bins of the DFT 120 in the receiver.

For example, an OFDM system may have M tones, N of which ($m_1$ through $m_N$) are used. The system operates over a channel with analog frequency response $H_c(f)$. Referring again to FIG. 1, the analog noise power spectral density at the input of the receiver A/D 80 is $S_\eta(f)$. Prior to receiver A/D 80, the received analog signal may be filtered by an anti-aliasing filter (i.e., receive filter 75) having a transfer function $H_a(f)$. The effective discrete-time impulse response (EDIR) of the transmission channel of the OFDM system (including the transmit filter 65 and receive filter 75) is h(n). The output of the A/D 80 is input to a SCISF 90 having an impulse response g(n). G(ω) is the spectral response corresponding to g(n).

The expected signal energy $_\mu(k)$ observed in frequency bin k at the output of the DFT 120, which has a length of NM, is:

$$\mu(k) = C_1 D_k \left|H\left(\frac{\pi k}{M}\right)\right|^2 \left|G\left(\frac{\pi k}{M}\right)\right|^2 ; H(\omega) = H_c\left(\frac{\omega}{2\pi T}\right) H_a\left(\frac{\omega}{2\pi T}\right) \quad (36)$$

where $C_1$ is a constant, 1/T is the sampling frequency and $D_k$ is the transmitted power in frequency bin k. The noise power η(k) in bin k is:

$$\eta(k) = C_2 \left[ S_\eta\left(\frac{\omega}{2\pi T}\right) |G(\omega)|^2 \left|H_a\left(\frac{\omega}{2\pi T}\right)\right|^2 \right] * \left[ \frac{\sin^2(M\omega)}{\sin^2\left(\frac{\omega}{2}\right)} \right]_{\omega = \frac{\pi k'}{M}} \quad (37)$$

where $C_2$ is a constant and * denotes a convolution of the discrete Fourier transforms. If the noise in the bands occupied by unused tones is sufficiently attenuated by the anti-alias filter (receive filter 75), η(k) is approximately:

$$\eta(k) \approx C_3 \sum_{l=M_1}^{M_2} S_\eta\left(\frac{l}{2MT}\right) \left|G\left(\frac{\pi l}{M}\right)\right|^2 \left|H_a\left(\frac{l}{2MT}\right)\right|^2 (\tau(k-l) + \tau(2M-k-l)), \quad (38)$$

where τ(n) is defined as:

$$\tau(n) = \int_{-\frac{\pi}{NM}}^{\frac{\pi}{NM}} \left[ \frac{\sin^2\left(M\left(\frac{\pi n}{M} - \lambda\right)\right)}{\sin^2\left(\frac{1}{2}\left(\frac{\pi n}{M} - \lambda\right)\right)} \right] d\lambda, \quad (39)$$

$m_1 \ldots m_N$ are the used tones, and $C_3$ is a constant. A vector of frequency magnitudes g is defined as:

$$g \triangleq \begin{bmatrix} \left|G\left(\frac{\pi m_1}{M}\right)\right|^2 \\ \vdots \\ \left|G\left(\frac{\pi m_N}{M}\right)\right|^2 \end{bmatrix} = \begin{bmatrix} G_1 \\ \vdots \\ G_N \end{bmatrix} \quad (40)$$

The SNR in frequency bin k is $$\frac{r_k G_k}{s_k^T g}$$

for scalars $r_k$ and vectors $s_k$. The scalars $r_k$ are defined by:

$$r_k \triangleq C_1 D_k \left| H\left(\frac{\pi k}{M}\right) \right|^2 \tag{41}$$

and $s_k(l)$, the lth component of $s_k$ is defined by:

$$s_k(l) = C_3 S \eta\left(\frac{l}{2MT}\right) \left| H_a\left(\frac{l}{2MT}\right) \right|^2 (\tau(k-l) + \tau(2M-k-l)) \tag{42}$$

To determine an expression for g that maximizes system bit throughput, the capacity of each frequency bin k is approximated by $\log(1+SNR_k)$. Accordingly, the optimal spectral profile is determined by minimizing the cost function F, where:

$$F(g) = -\sum_{k=m_1}^{m_N} \log\left(1 + \frac{r_k G_k}{s_k^T g}\right) \tag{43}$$

Since $G_k = |G(\pi m_k/M)|^2$, the minimization of the cost function is performed over all positive values of $G_k$, as:

$$g_{opt} = \underset{g \in G}{\operatorname{argmin}} F(g) \tag{44}$$

where:

$$G = \{g \in R^N : \|g\| = 1, G_l \geq 0, 1 \leq i \leq N\}. \tag{45}$$

A variety of constrained optimization strategies may be used to solve the above equations for $g_{opt}$.

Figure 13:
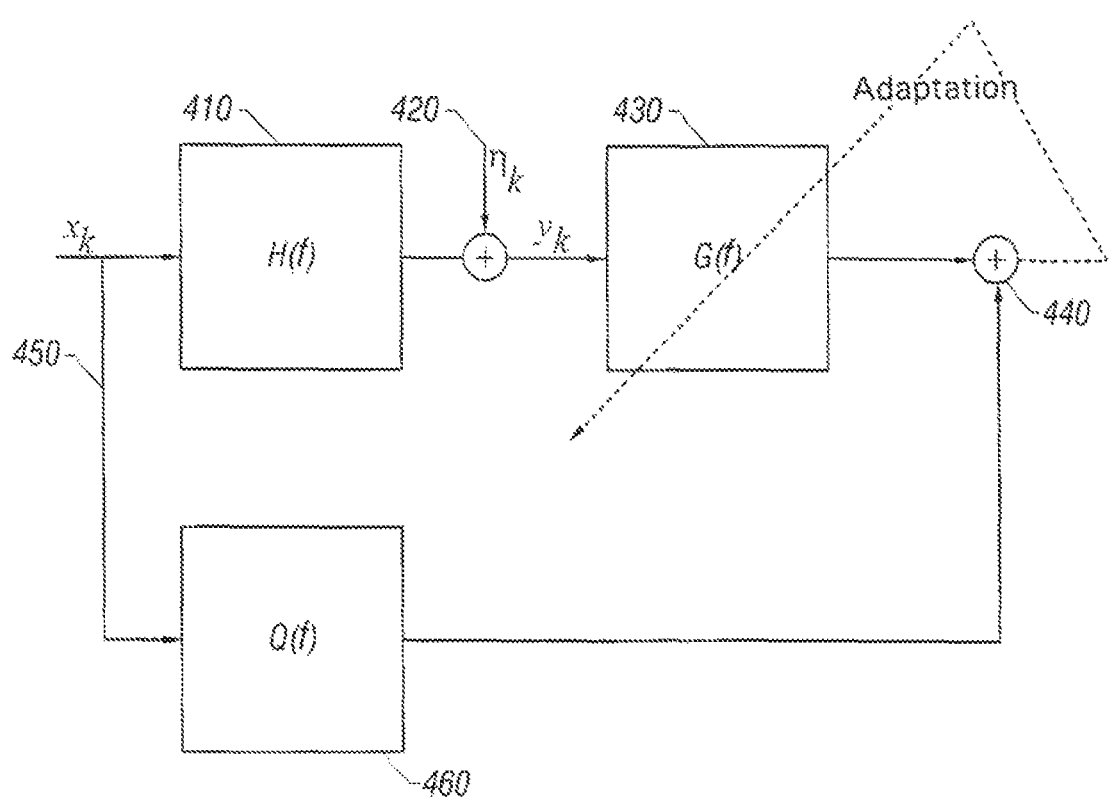
FIG. 13 is a block diagram of a generalized adaptation system that employs frequency scaling in the feedback loop.

Once the optimal impulse response $g_{opt}$ and desired spectral response $G_d(\omega)$ (which may be expressed as $G_d(\pi m_k/M)$ for a system having M tones) have been determined, a training process is used to adapt the SCISF 90 so that its impulse response g matches the desired spectral response. As shown in FIG. 13, the training process may be generalized as a feedback system. A reference sequence $x_k$ is input to the system. This corresponds to inputting a predetermined reference bit sequence to a transmitter. The reference sequence passes through a transmission channel 410 having frequency response H(f) (including the physical transmission channel and the transmit and receive filters). Additive noise $\eta_k$ from the transmission channel is represented in this general model as an external input 420 to the system. The resulting signal $y_k$ is input to a filter 430 having a frequency response G(f), e.g., a SCISF. The output of the filter 430 is then passed to an adaptation processor 440, which computes an error signal based on the feedback loop 450 and adapts the filter accordingly. The adaptation processor may, for example, use the LMS algorithm described above.

The reference sequence $x_k$ is also input to the feedback loop 450, which passes the reference sequence $x_k$ through a scaling filter 460 with frequency characteristic Q(f). The frequency characteristic Q(f) of the scaling filter 460 (which may be expressed as a set of frequency domain scaling factors $Q_k$) is determined so that the SCISF adapts to the desired spectral response. The output of the scaling filter 460 is used a reference for the calculation of the error signal in the adaptation processor 440, as described above.

Using the general feedback system shown in FIG. 13, a SCISF having an impulse response g may be trained to minimize the error $\|q*x - x*g*h - \eta*g\|^2$. The resulting filter matches $P_2(\omega)$ in the frequency domain in a least-squares sense, where:

$$P_2(\omega) = \frac{S_x(\omega) H*(\omega) Q(\omega)}{S_x(\omega)|H(\omega)|^2 + S_\eta(\omega)}, \tag{46}$$

$S_x(\omega)$ is the power-spectral density at the input of the system, $H(\omega)$ is the frequency response of the effective discrete-time impulse response (EDIR) of the transmission channel, $S_\eta(\omega)$ is the power spectral density of the additive noise, and $Q(\omega)$ is the spectral response of the scaling filter 460 having impulse response q.

The solution for $g_{opt}$ in the equations above specifies only the magnitude of the spectral response of the SCISF. If the SCISF is a FIR filter, a linear phase characteristic may be used. If the length of the SCISF is $n_g$, the desired values of $G(\omega)$ for the frequency bins of interest are:

$$G_d(\pi M_k/M) \triangleq \sqrt{g_{opt}(k)} \exp\left(\frac{-j\pi M_k(n_g - 1)}{2M}\right). \tag{47}$$

The values $Q_k$ are defined by:

$$Q_k = \frac{G_d(\pi m_k/M)(S_x(j\pi k/M)|H(j\pi k/M)|^2 + S_\eta(j\pi k/M))}{S_\eta(j\pi k/M) H*(j\pi k/M)}. \tag{48}$$

The values of $Q_k$ may be computed during an initial training period and may be periodically updated during operation of the communication system.

Figure 14:
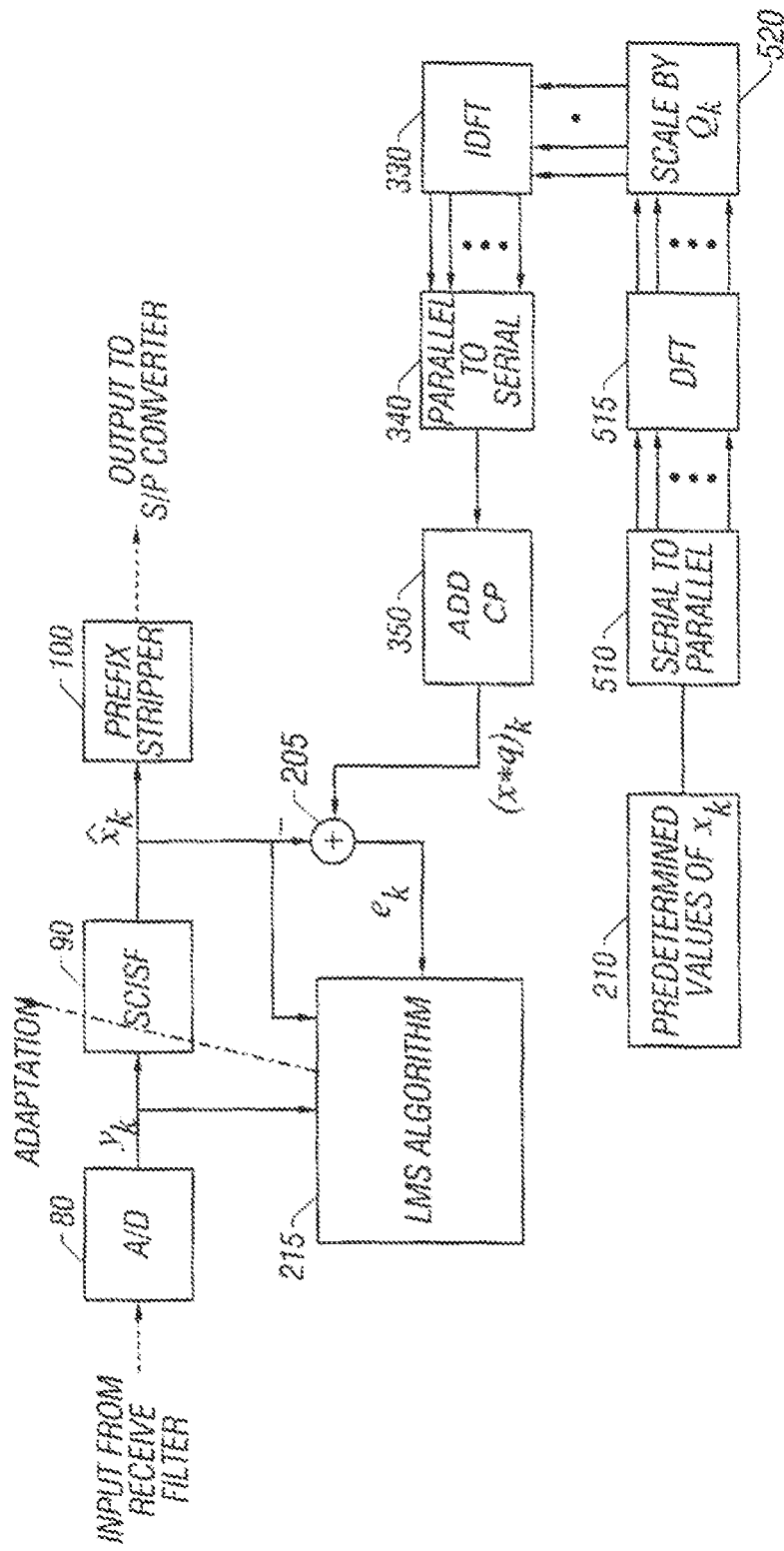
FIG. 14 is a block diagram of a system for adapting a spectrally constrained impulse shortening filter in an initial training process that includes frequency scaling in the feedback loop.
Figure 15:
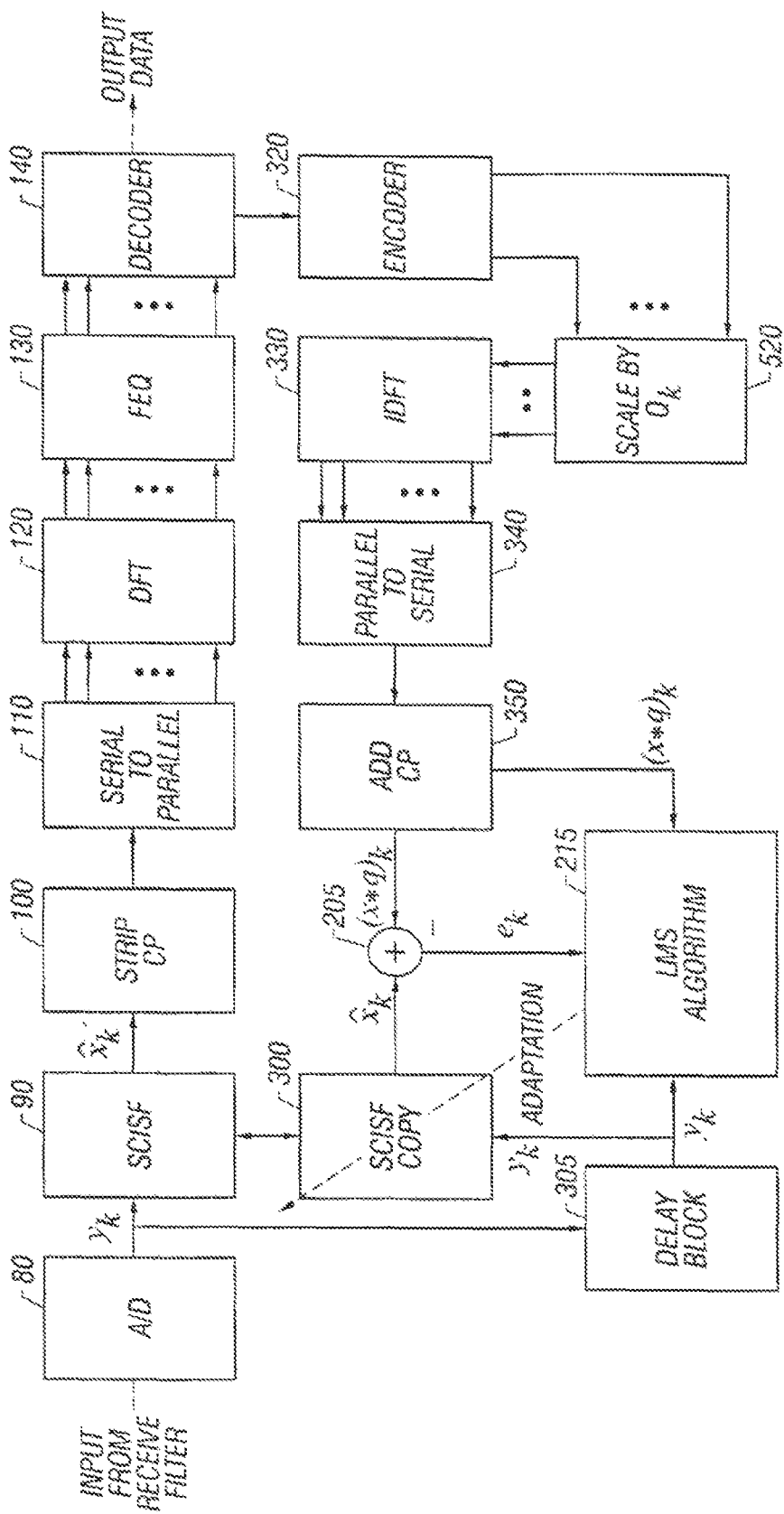
FIGS. 15 and 16 are block diagrams of a system for adapting a spectrally constrained impulse shortening filter in an periodic or continuous training process that includes frequency scaling in the feedback loop.
Figure 16:
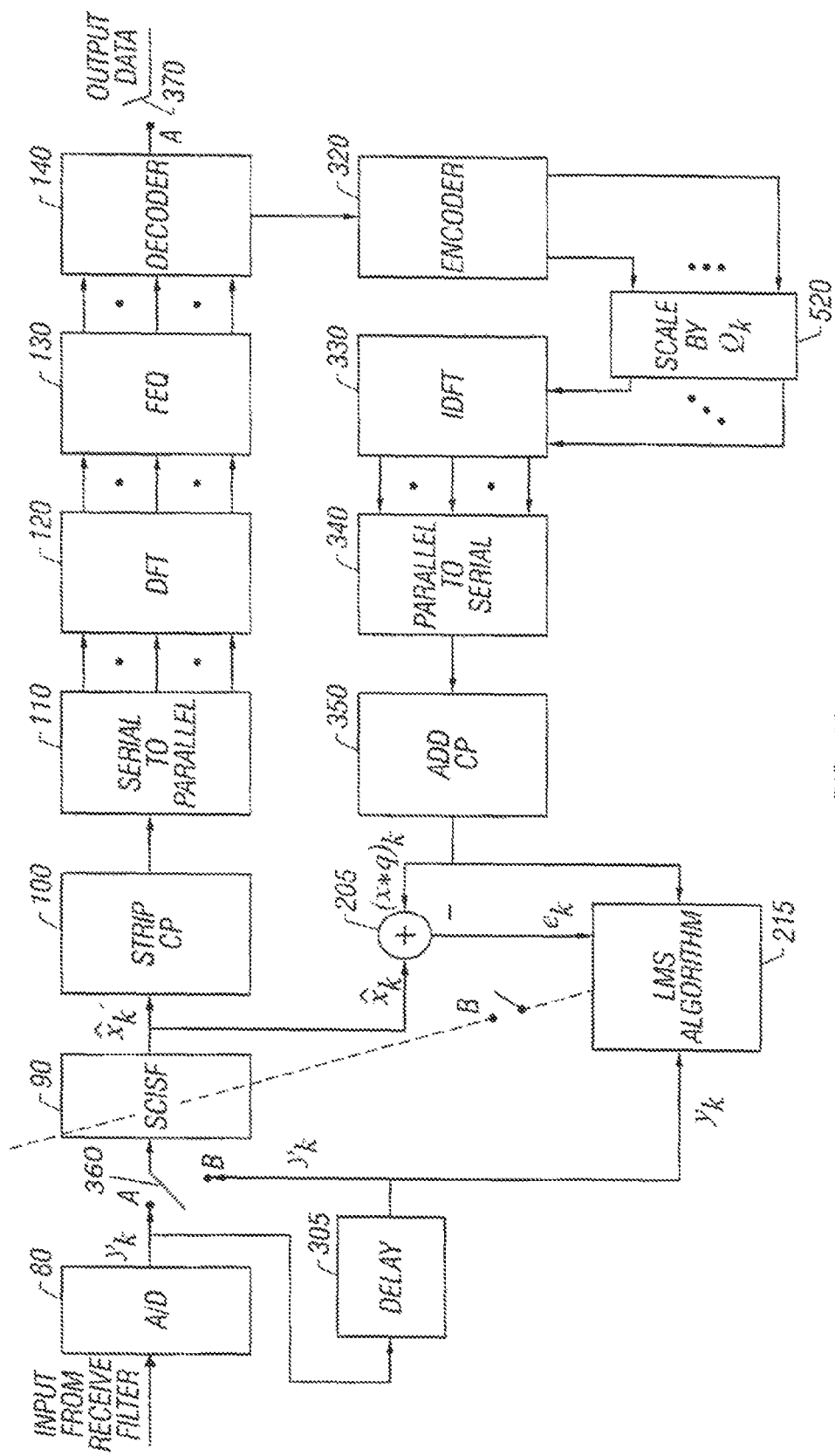

As shown in FIGS. 14-16, the general feedback training process may be used to perform an initial training of a SCISF followed by periodic training analogous to the process described above with respect to FIGS. 10-12. One difference between the techniques is that a scaled reference signal $(x*q)_k$ is used rather than an unscaled reference $x_k$.

Referring to FIG. 14, to perform the initial training, a predetermined sequence of bits $x_k$ is input to the transmitter. The transmitted signal is filtered and noise-corrupted by the transmission channel, resulting in a received sequence $\{y_k\}$ at the output of the A/D 80 in the receiver. The SCISF 90 filters and transforms the received sequence $\{y_k\}$ into an output sequence $\{\hat{x}_k\}$. The output sequence $\{\hat{x}_k\}$ is compared (in a signal comparator 205) to a scaled reference sequence $(x*q)_k$.

The scaled reference sequence is computed from a copy of the predetermined sequence $x_k$ that is stored in memory 210 in the receiver. As a first step, the predetermined sequence is input to a serial to parallel converter 510 and a DFT 515. The resulting frequency domain signal is input to a scaling filter 520 which applies the set of frequency domain scaling factors $Q_k$ that causes the SCISF to adapt to the desired spectral response, as discussed above. The scaled signal is input to an inverse discrete Fourier transform 330, a parallel to serial converter 340 and a cyclic prefix adder 350, resulting in a scaled reference sequence $(x*q)_k$. The comparison of the output sequence $\{\hat{x}_k\}$ to the scaled reference sequence $(x*q)_k$ results in an error signal $e_k$ that is input to the LMS algorithm processor 215 along with sequence $\{\hat{x}_k\}$. Alternatively, a frequency domain reference (e.g., a predetermined bit sequence that has been processed by a serial to parallel converter and DFT) may be stored in memory in the receiver, which would eliminate the need for the serial to parallel converter and discrete Fourier transform in the feedback loop.

Following the initial training, the SCISF is periodically trained during operation of the communication system. A sequence of communication data bits $x_k$ is input to the transmitter. Referring to FIG. 15, the transmitted signal is filtered and noise-corrupted by the transmission channel, resulting in a received sequence $\{y_k\}$ at the output of the A/D 80 in the receiver. The SCISF 90 filters and transforms the received sequence $\{y_k\}$ into an output sequence $\{\hat{x}'_k\}$.

The received sequence $\{y_k\}$ is also input to a delay 305 and then to a secondary SCISF 300 that has the same coefficients as the primary SCISF 90 following the initial training. The secondary SCISF 300 provides output sequence $\{\hat{x}_k\}$, which is compared to a reference sequence during the periodic training process. Such a configuration allows periodic training to be performed without disruption to the operation of the communication system. The secondary SCISF 300 is periodically or continuously trained using an algorithm similar to that used for the initial training. The new coefficients of the secondary SCISF 300 are periodically copied to the primary SCISF 90.

To compute the reference sequence, the data output of the decoder 140 is input to an encoder 320. The resulting frequency domain signal is input to a scaling filter 520 which applies the set of frequency domain scaling factors $Q_k$ that causes the SCISF to adapt to the desired spectral response, as discussed above. The scaled signal is input to an inverse discrete Fourier transform 330, a parallel to serial converter 340 and a cyclic prefix adder 350, resulting in a scaled reference sequence $(x*q)_k$. The comparison of the output sequence $\{\hat{x}_k\}$ to the scaled reference sequence $(x*q)_k$ results in an error signal $e_k$ that is input to the LMS algorithm processor 215. The training process determines coefficients for the secondary SCISF 300 so that the output $\{\hat{x}_k\}$ matches the scaled reference sequence $(x*q)_k$ as closely as possible in a least squares sense, i.e., the mean square error between the output and the reference sequence is minimized. Periodically, the coefficients of the secondary SCISF 300 are copied to the primary SCISF 90.

Alternatively, as shown in FIG. 16, the periodic training may be performed with a single SCISF 90. In this configuration, a received sequence $\{y_k\}$ is output by the A/D 80 in the receiver. The SCISF 90 filters and transforms the received sequence $\{y_k\}$ into an output sequence $\{\hat{x}_k\}$. The received sequence $\{y_k\}$ is also input to a delay. After the received sequence $\{y_k\}$ passes through the SCISF 90, a data switch 360 is changed from position A to position B, allowing the delayed received sequence to make a second pass through the SCISF 90. An output switch 370 also may be opened, so that data is not output during the training process. In addition, the SCISF coefficients are controlled by the LMS algorithm during the training process.

A reference sequence is computed as in the configuration of FIG. 15. The data output of the decoder 140 is input to an encoder 320. The resulting frequency domain signal is input to a scaling filter 520 which applies the set of frequency domain scaling factors $Q_k$ that causes the SCISF to adapt to the desired spectral response, as discussed above. The scaled signal is input to an inverse discrete Fourier transform 330, a parallel to serial converter 340 and a cyclic prefix adder 350, resulting in a scaled reference sequence $(x*q)_k$. The scaled reference sequence is input to the LMS algorithm processor.

The output sequence $\{\hat{x}_k\}$ of the second pass through the SCISF 90 is compared (in signal comparator 205) to the reference sequence $(x*q)_k$. As noted above, the received sequence $\{y_k\}$ passes through a delay 305 before being input to the SCISF 90 for the second pass. The delay 305 compensates for the processing delay in the demodulation/decoding chain and the encoding/modulation chain. The comparison results in an error signal $e_k$ that is input to the LMS algorithm processor 215. The training process determines coefficients for the SCISF 90 so that the output $\{\hat{x}_k\}$ matches the scaled reference sequence $(x*q)_k$ as closely as possible in a least squares sense, i.e., the mean square error between the output and the reference sequence is minimized. The coefficients of the SCISF 90 then are updated to the coefficients determined in the training process.

In a third embodiment, the system dynamically selects the length of the cyclic prefix (CP) to maximize data throughput for a communication channel having a particular noise profile. As discussed above, a CP is added to each symbol prior to transmission through the communication channel to reduce the effects of ISI. However, because the CP constitutes redundant data, increasing the length of the CP reduces the efficiency of the communication system. Hence, to maximize efficiency, the length of the CP must be as short as the noise characteristics of the communication channel permit.

For a DMT communication, system with M tones, the maximum sample rate W (samples/second) for a particular channel depends, in part, on the available bandwidth and hardware limitations. The sample rate includes communication data and CP bits. For a CP length of $n_c$, the maximum symbol rate (which includes communication data, but not the CP) is $W/(2M+n_c)$.

Before determining the optimal CP length, the SCISF should be initially trained to the channel. However, a communication system need not have a SCISF to employ the CP optimization algorithm. It is noted that the SCISF coefficients determined during the training process do not depend on the CP length. The capacity of the sub-channel may be approximated as $\log(1+SNR_i)$ bits per second, so the number of bits per symbol is $\Sigma_i \log(1+SNR_i)$. For a CP length of $n_c$, the maximum bit rate is expressed as a function of the cyclic prefix as:

$$B_a(n_c) = \frac{W \sum_j \log(1 + SNR_i)}{2M + n_c} \qquad (49)$$

The optimal CP length is determined by computing the maximum bit rate for a set of candidate values of CP length and finding the length that maximizes $B_a(n_c)$.

The signal to noise ratio $SNR_i$ of each subchannel is determined by measuring the received signal and noise power and computing the ratio of the two. The noise power $\gamma_i$ for the $i^{th}$ bin may be measured by transmitting a data communication sequence and computing the average of the squares of the errors measured at the output of the receiver DFT. The total received power (signal and noise) $\delta_i$ for the $i^{th}$ bin may be measured by computing the average of the squares of the outputs of the receiver DFT. The signal to noise ratio is determined from the expression: $\delta_i/\gamma_i=1+SNR_i$. Since the signal to noise ratio is determined in the receiver, the computed bit rate $B_a(n_c)$ must be transmitted back to the transmitter. The transmitter compares the bit rate to the values computed for other candidate CP lengths and selects the CP length $n_c$ with the highest maximum bit rate $B_a(n_c)$.

FIGS. 17-24 show performance simulations for test systems based on system parameters and test loops described in *VDSL Alliance SDMT VDSL Draft Standard Proposal*, Technical report, ANSI, 1998; and *Very-high-speed digital subscriber lines: System requirements*, T1E1.4/97-131R1, Technical report, ANSI, 1997. The results are for a VDSL system working over test loops 2 and 6 of length 4500 feet in the upstream direction. The system has a sampling frequency of 11.04 MHz. Noise is generated by near-end cross talk from an interfering ADSL and an interfering HDSL and white noise at a level of −140 dBm. The SCISF used in the simulations is length-15 FIR. A version of the Normalized LMS algorithm is used to train the SCISF during an initial training period using a predetermined transmitted sequence.

Figure 17:
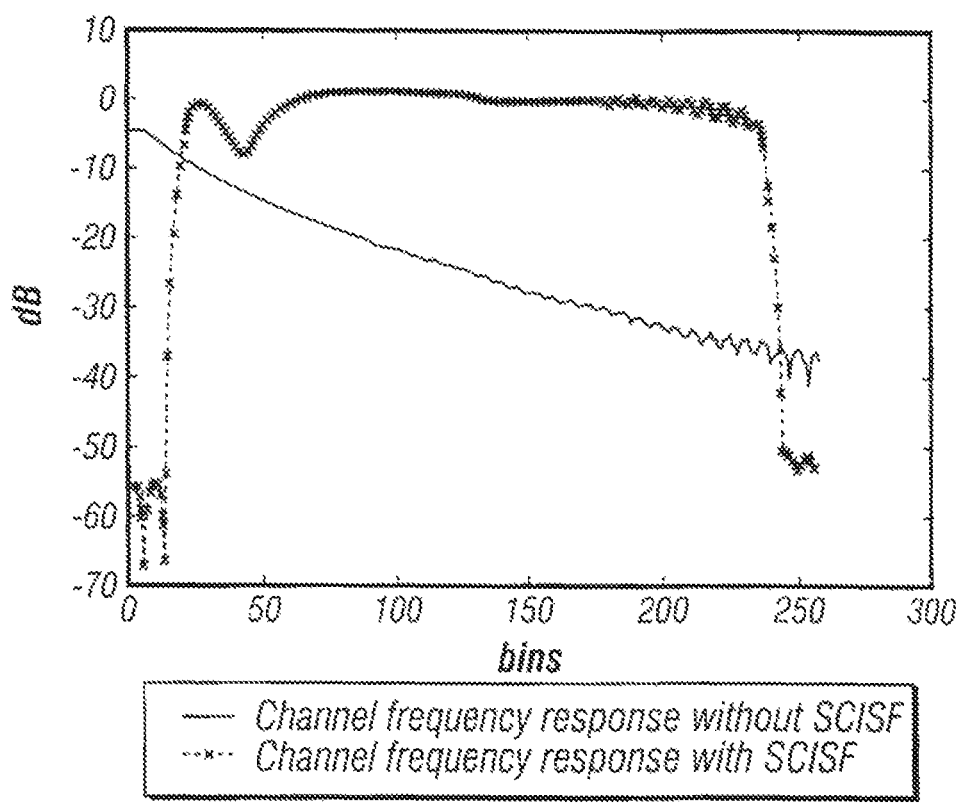
FIGS. 17-20 are plots of simulation results for a discrete multi-tone system.
Figure 18:
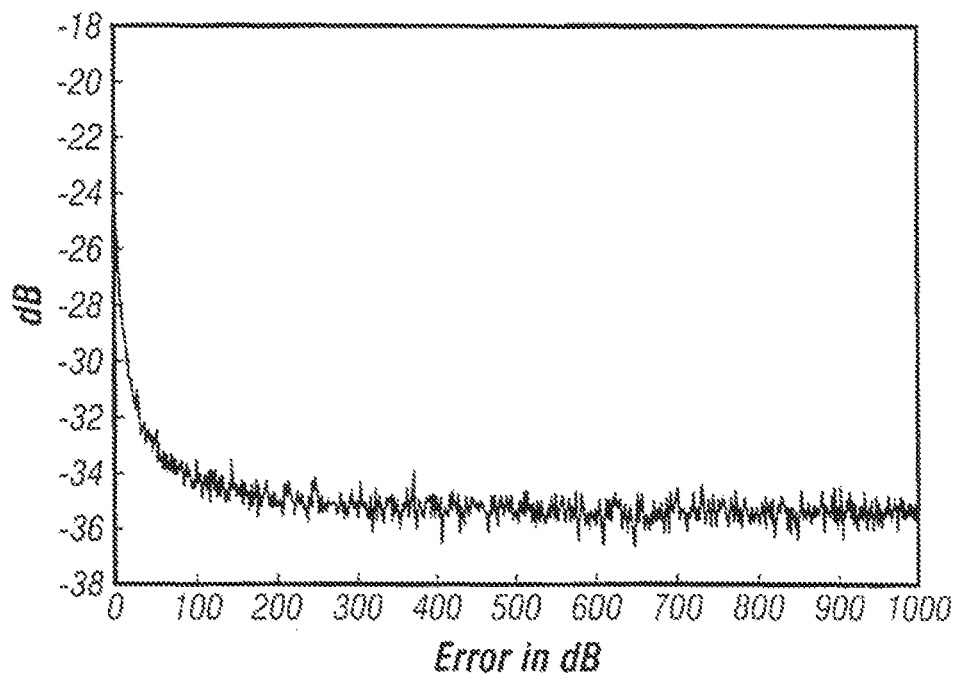
Figure 19:
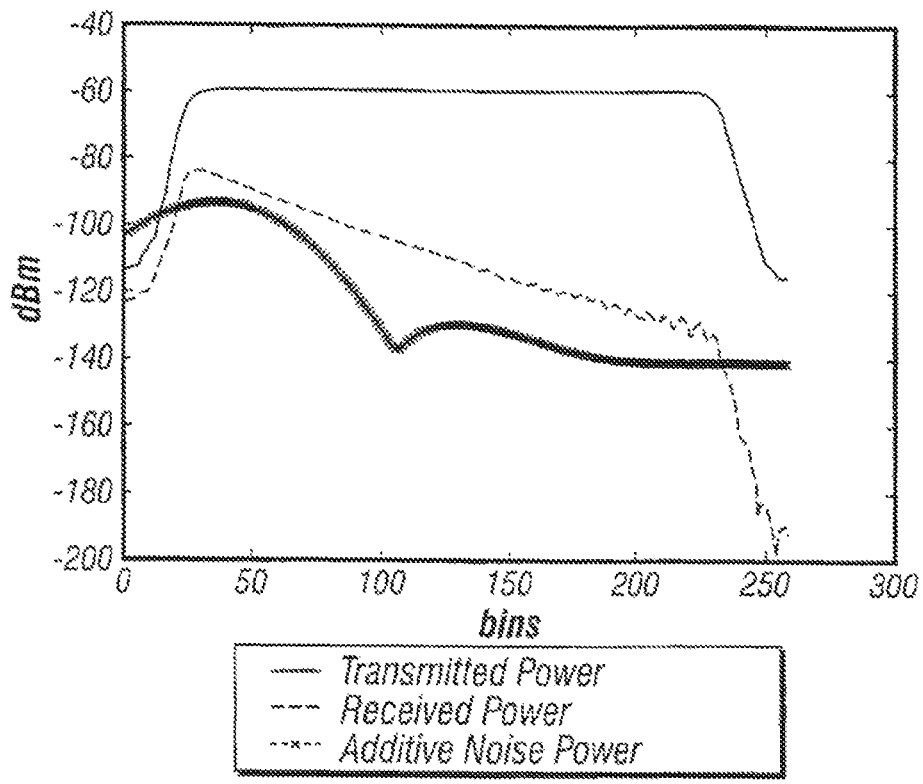
Figure 20:
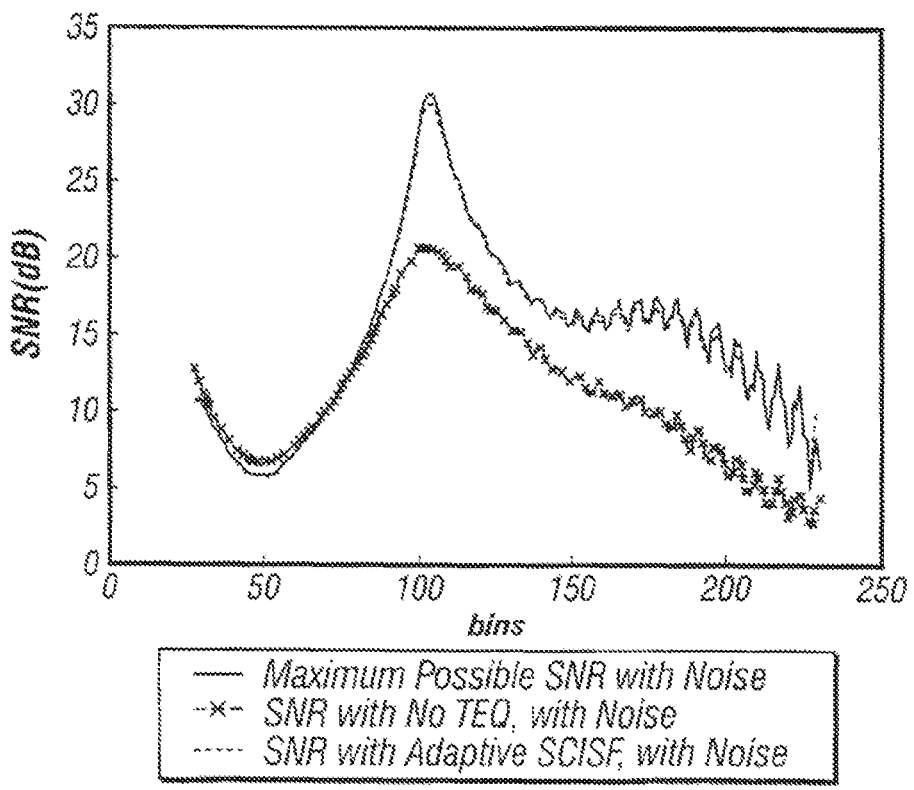

FIGS. 17-20 show the simulated system performance for a communication system having the parameters defined for Test Loop 2, which is 4500 feet in length. FIG. 17 shows channel frequency response with and without a SCISF. The SCISF provides a much more uniform frequency response across the frequency band of interest and significantly improves the signal to noise ratio (SNR) in the higher frequency bins. FIG. 18 is a plot of the error signal (10 log $|\hat{x}_k - x_k|$) during the training process. The error decreases rapidly during the first few iterations and is nearly converged after only 20-30 iterations. FIG. 19 is a plot of transmitted power spectral density, received power spectral density and the additive noise power spectral density over the used subchannels at the output of the receiver A/D. FIG. 20 is a plot of SNR at the input to the receiver A/D, which is the maximum attainable SNR. The plot also shows the SNR at the output of the receiver DFT without a SCISF and the SNR at the outputs of the receiver DFT using an adapted SCISF.

Figure 21:
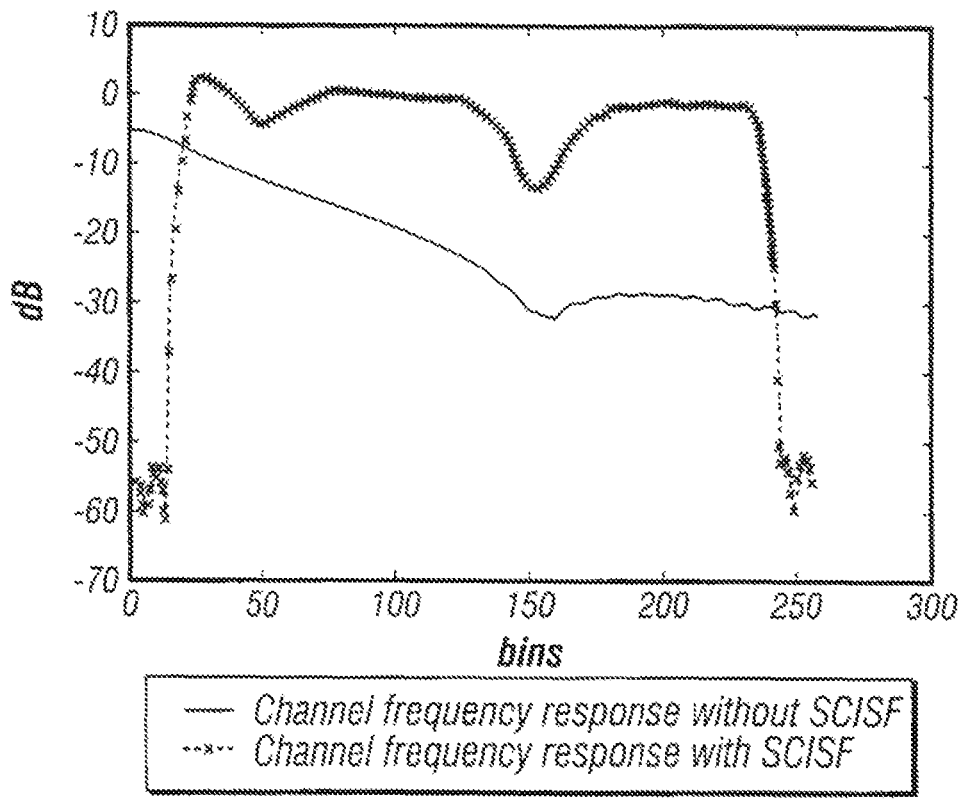
FIGS. 21-24 are plots of simulation results for a discrete multi-tone system.
Figure 22:
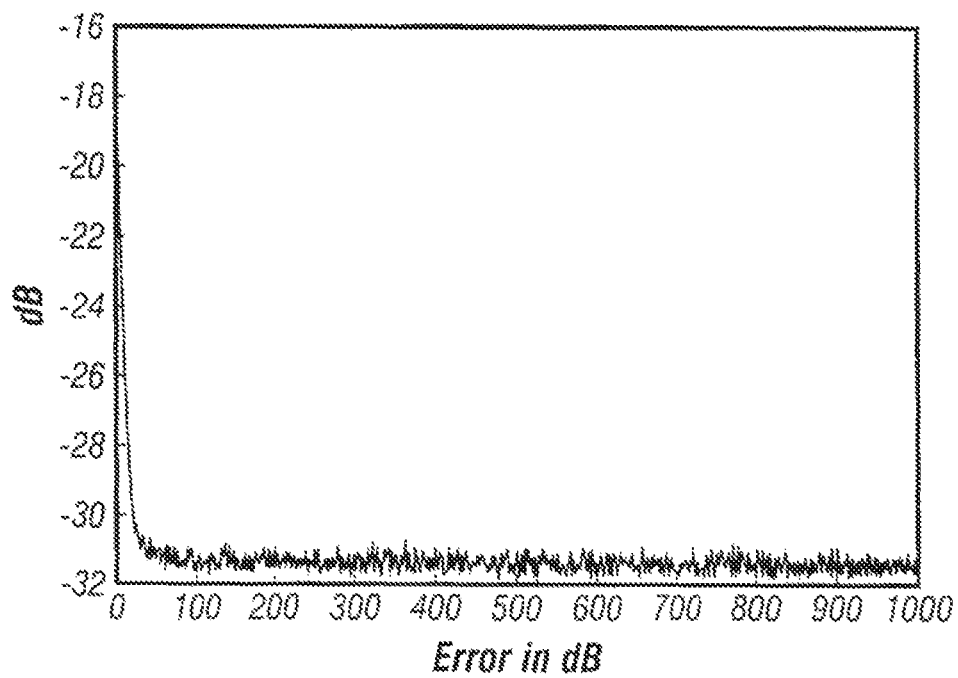
Figure 23:
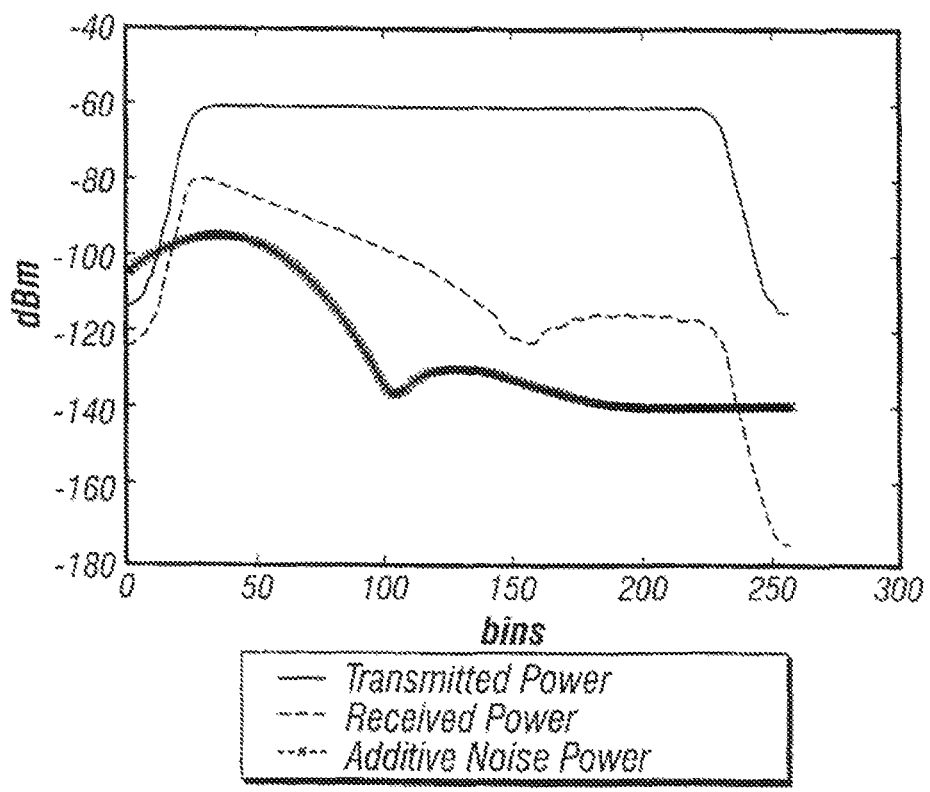
Figure 24:
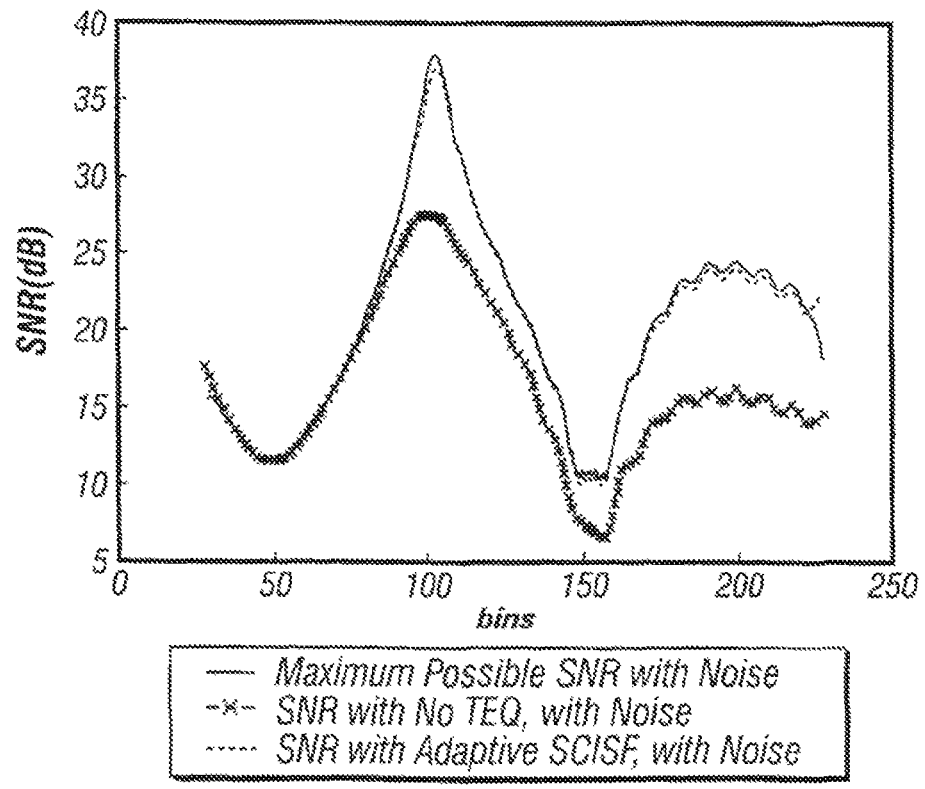

FIGS. 21-24 show the simulated system performance for a communication system having the parameters defined for Test Loop 6, which is 4500 feet in length. FIG. 21 shows channel frequency response with and without a SCISF. FIG. 22 is a plot of the error signal (10 log $|\hat{x}_k - x_k|$) during the training process. FIG. 23 is a plot of transmitted power spectral density, received power spectral density and the additive noise power spectral density over the used subchannels at the output of the receiver A/D. FIG. 24 is a plot of SNR at the input to the receiver A/D. The plot also shows the SNR at the output of the receiver DFT without a SCISF and the SNR at the outputs of the receiver DFT using an adapted SCISF.

Other embodiments are within the scope of the following claims.

What is claimed is:

1. A digital filter for a multiple carrier, multi-channel, communication system, the digital filter comprising:
   a digital filter structure configured to apply a frequency characteristic according to a filter characteristic, g(n), to a digital Orthogonal Frequency Division Multiplexing (OFDM) signal;
   taps coupled to the digital filter structure and configured to receive digital filter coefficients,
      the number of digital filter coefficients being less than or equal to a number of coefficients to set an effective length of convolution of the filter characteristic with an impulse response of the communication channel, g(n)*h(n), less than a target length; and
      the filter structure configured to apply, via the taps, coefficients adjusted according to a cost function, to minimize a difference between a desired spectral response, $G_d(\omega)$, and an actual spectral response, $G(\omega)$, of the digital filter to adjust the filter characteristic, g(n).

2. The digital filter of claim 1 wherein the desired spectral response, $G_d(\omega)$, of the digital filter is computed from a measured noise power spectral density at the input to the digital filter.

3. The digital filter of claim 2 wherein the noise power spectral density is measured at an output of a discrete Fourier transform.

4. The digital filter of claim 2 wherein the desired spectral response, $G_d(\omega)$, is an inverse of the measured noise power spectral density.

5. The digital filter of claim 2 wherein the measured noise power spectral density is used to compute the cost function, the cost function being dependent on an impulse response of the digital filter, and the digital filter further coupled to a processor arranged to reduce dimensionality of a space over which the cost function is defined and minimizes the cost function.

6. The digital filter of claim 1 coupled to:
   a discrete Fourier transform connected to receive an output of the filter; and
   a decoder connected to receive an output of the discrete Fourier transform and output digital data.

7. The digital filter of claim 1 wherein recited features are incorporated in a modem.

8. The digital filter of claim 1 coupled to:
   a secondary digital filter, having secondary coefficients being the same as the filter coefficients of the digital filter, the secondary digital filter connected to receive a digital signal, output a secondary filter output signal, and copy the secondary coefficients to the digital filter, and further connected to:
      a reference signal generator configured to output a reference signal;
      a comparator connected to the secondary filter and reference signal generator and configured to compare the secondary filter output signal and the reference signal and output a resulting error signal; and
      an adaptive processor configured to compute new coefficients for the secondary digital filter based on the error signal and update the secondary coefficients to be the same as the new coefficients.

9. The digital filter of claim 1 coupled to:
   a reference signal generator configured to output a reference signal;
   a comparator connected to compare an output signal of the digital filter and the reference signal and output a resulting error signal; and
   an adaptive processor configured to compute coefficients for the digital filter based on the error signal.

10. The digital filter of claim 9 coupled to:
    a decoder to decode the output signal of the digital filter to form output data; and
    an encoder to encode the output data to form the reference signal.

11. The digital filter of claim 1 further configured to receive, at an input of the digital filter, a digital signal output from an analog-to-digital converter configured to receive the digital OFDM signal from a communication channel in the multi-channel communication system;
    the communication channel in the multi-channel communication system arranged to receive the signal output from a digital-to-analog converter;
    the digital-to-analog converter connected to an inverse discrete Fourier transform, the inverse discrete Fourier transform connected to receive a constellation of complex values from an encoder.

12. The digital filter of claim 1 wherein the target length is a length of a cyclic prefix.

13. A method for adapting a digital filter in a multicarrier, multi-channel, communication system, the method comprising:
applying a frequency characteristic according to a filter characteristic, g(n), to a digital Orthogonal Frequency Division Multiplexing (OFDM) signal;
producing the filter characteristic, g(n), through use of digital filter coefficients, received via taps, the number of coefficients being less than or equal to a number of coefficients to set an effective length of convolution of the filter characteristic with an impulse response of a communication channel, g(n)*h(n), less than a target length; and
adjusting the digital filter coefficients, via the taps, by applying a cost function to minimize a difference between a desired spectral response, $G_d(\omega)$, and an actual filter spectral response, $G(\omega)$, of the digital filter to adjust the filter characteristic g(n).

14. The method of claim 13 further including computing the desired spectral response, $G_d(\omega)$, of the filter from a measured noise power spectral density at an input to the filter.

15. The method of claim 14 further including measuring the noise power spectral density at an output of a discrete Fourier transform.

16. The method of claim 14 further including basing the desired spectral response, $G_d(\omega)$, on an inverse of the measured noise power spectral density.

17. The method of claim 13 further including:
receiving a delayed digital signal at a secondary digital filter having secondary coefficients being the same as the filter coefficients of the digital filter;
generating a reference signal at a reference signal generator;
comparing at a comparator an output signal of the secondary digital filter to the reference signal to compute an error signal;
computing new coefficients of the secondary digital filter in an adaptive processor based on the error signal;
updating the secondary coefficients with the new coefficients; and
replacing the filter coefficients of the digital filter with the updated secondary coefficients of the secondary digital filter.

18. The method of claim 17 further including:
decoding at a decoder an output signal of the digital filter to form output data; and
encoding at an encoder the output data to form the reference signal.

19. The method of claim 13 further including:
computing a reference signal from an output signal of the digital filter;
delaying the digital signal to produce a delayed digital signal;
applying the delayed digital signal to the digital filter to obtain a second output signal;
comparing at a comparator the second output signal to the reference signal to compute an error signal; and
computing new coefficients of the digital filter in an adaptive processor based on the error signal.

20. The method of claim 13 further comprising:
selecting the target length from a set of candidate lengths;
transmitting data having a cyclic prefix of the selected target length to a receiver;
computing a maximum bit rate value in the receiver for the selected target length; and
sending the maximum bit rate value to a transmitter.

21. A non-transitory computer readable medium having stored thereon instructions that, when loaded and executed by a digital signal processor, cause the processor to:
apply a frequency characteristic according to a filter characteristic, g(n), to a digital Orthogonal Frequency Division Multiplexing (OFDM) signal;
select digital filter coefficients to produce the filter characteristic, g(n), the number of coefficients being less than or equal to a number of coefficients to set an effective length of convolution of the filter characteristic with an impulse response of a communication channel, g(n)*h(n), less than a target length; and
adjust the digital filter coefficients by applying a cost function to minimize a difference between a desired spectral response, $G_d(\omega)$, and an actual filter spectral response, $G(\omega)$, of the digital filter to adjust the filter characteristic g(n).

* * * * *